US012811923B2

(12) United States Patent
Choi et al.

(10) Patent No.: US 12,811,923 B2
(45) Date of Patent: Nov. 24, 2026

(54) THREAD CREDENTIALS DISTRIBUTION SERVICE

(71) Applicant: Google LLC, Mountain View, CA (US)

(72) Inventors: Yoon Hyung Choi, Sunnyvale, CA (US); Han Jong Yu, Santa Clara, CA (US); Jonathan Wing-Yan Hui, Belmont, CA (US); Yakun Xu, Shanghai (CN)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/067,333

(22) Filed: Feb. 28, 2025

(65) Prior Publication Data

US 2025/0294015 A1 Sep. 18, 2025

Related U.S. Application Data

(60) Provisional application No. 63/565,787, filed on Mar. 15, 2024.

(51) Int. Cl.
*H04L 9/40* (2022.01)
*H04L 9/08* (2006.01)

(52) U.S. Cl.
CPC ............ *H04L 63/08* (2013.01); *H04L 9/0891* (2013.01); *H04L 63/0428* (2013.01); *H04L 63/062* (2013.01); *H04L 63/12* (2013.01)

(58) Field of Classification Search
CPC ... H04L 63/08; H04L 63/062; H04L 63/0428; H04L 9/0891; H04L 63/12
USPC .............................................................. 726/4
See application file for complete search history.

(56) References Cited

U.S. PATENT DOCUMENTS

| | | | | |
|---|---|---|---|---|
| 9,948,516 B2 * | 4/2018 | Turon | .................. | H04W 12/37 |
| 11,336,635 B2 * | 5/2022 | Park | ........................ | H04W 4/70 |
| 11,373,172 B1 * | 6/2022 | Griffin | .................. | H04L 9/0897 |
| 2010/0185864 A1 * | 7/2010 | Gerdes, Jr. | ............ | H04L 9/3213 713/176 |

(Continued)

FOREIGN PATENT DOCUMENTS

EP 4216589 A1 7/2023

OTHER PUBLICATIONS

"Extended European Search Report", EP Application No. 25161896.3, May 13, 2025, 11 pages.

(Continued)

*Primary Examiner* — Thanh T Le
(74) *Attorney, Agent, or Firm* — Colby Nipper PLLC

(57) ABSTRACT

Techniques and devices are described for managing Thread network credentials by a Thread credential distribution service (TCDS). By establishing a secure session with a client device, the TCDS receives, from the client device, a first message that requests Thread network credentials, and based on the received first message, validates an identity of the client device. Using a Thread credential identifier, the TCDS queries a TCDS database to retrieve Thread network credentials associated with the Thread credential identifier and receives, from the TCDS database, the Thread network credentials associated with the Thread credential identifier. The TCDS encrypts the Thread network credentials, signs the encrypted Thread network credentials, and sends the signed, encrypted Thread network credentials to the client device.

20 Claims, 14 Drawing Sheets

(56) References Cited

U.S. PATENT DOCUMENTS

| | | | | |
|---|---|---|---|---|
| 2016/0066183 | A1* | 3/2016 | Conant | H04L 63/0853 726/6 |
| 2019/0114432 | A1* | 4/2019 | Tang | G06F 21/81 |
| 2020/0274868 | A1* | 8/2020 | Passaglia | G06K 7/1413 |
| 2021/0234845 | A1* | 7/2021 | Smelov | H04L 63/0435 |
| 2022/0027519 | A1* | 1/2022 | Kataria | H04L 63/10 |
| 2022/0414266 | A1* | 12/2022 | Preimesberger | G06F 21/602 |

OTHER PUBLICATIONS

"Thread Commissioning—White Paper", https://www.threadgroup.org/Portals/0/documents/support/CommissioningWhitePaper_658_2.pdf, Jul. 2015, 26 pages.
"Thread Network Fundamentals—White Paper", https://portal.threadgroup.org/DesktopModules/Inventures_Document/FileDownload.aspx?ContentID=633, Sep. 2022, 20 pages.
"Foreign Office Action", EP Application No. 25161896.3, Jul. 23, 2026, 11 pages.

* cited by examiner

1000

THREAD CREDENTIALS DISTRIBUTION SERVICE

CROSS-REFERENCE TO RELATED APPLICATION(S)

This application claims the benefit of U.S. Provisional Patent Application Ser. No. 63/565,787 filed on Mar. 15, 2024, the disclosure of which is incorporated by reference herein in its entirety.

BACKGROUND

Using wireless networking to connect devices to each other, and to cloud-based services, is increasingly popular for sensing environmental conditions, controlling equipment, and providing information and alerts to users. Many devices on wireless networks are designed to operate for extended periods of time on battery-power, which limits the available computing, user interface, and radio resources in these devices. Additionally, to ensure the security of mesh networks, the identity of devices joining and operating on a mesh network is authenticated, and communication within the mesh network is encrypted, based on credentials that are commissioned into the devices. However, with the increasing ubiquity and scale of mesh networks, commissioning techniques limit the quality of user experience for commissioning, the accuracy of joining a device to the correct mesh network, securely injecting credentials into the devices, and provisioning device-specific and application-specific information into a device during commissioning.

SUMMARY

This summary is provided to introduce concepts of a Thread credentials distribution service, generally related to commissioning wireless network devices to Thread networks using a cloud-based Thread Credential Distribution Service (TCDS). The concepts are further described below in the Detailed Description. This summary is not intended to identify essential features of the claimed subject matter, nor is it intended for use in determining the scope of the claimed subject matter.

In aspects, methods, devices, systems, and means for a Thread credentials distribution service (TCDS) are described for obtaining Thread network credentials by establishing a secure session with a client device and receiving, from the client device, a first message that requests Thread network credentials. Based on the received first message, the TCDS validates an identity of the client device, using a Thread credential identifier, queries a TCDS database to retrieve Thread network credentials associated with the Thread credential identifier, and receives, from the TCDS database, the Thread network credentials associated with the Thread credential identifier. The TCDS encrypts the received Thread network credentials, signs the encrypted Thread network credentials, and sends the signed, encrypted Thread network credentials to the client device.

In aspects, methods, devices, systems, and means for a Thread credentials distribution service (TCDS) are described for updating Thread network credentials by receiving a second message at the TCDS that requests to update Thread credentials that are stored in a TCDS database, the second message including encrypted, updated Thread network credentials. The TCDS decrypts the updated Thread network credentials, validates the decrypted, updated Thread network credentials, and stores the validated, updated Thread network credentials in the TCDS database.

In aspects, methods, devices, systems, and means for a Thread credentials distribution service (TCDS) are described for deleting Thread network credentials from the TCDS by receiving a third message that requests to delete Thread credentials that are stored in a TCDS database, the third message including a user identity and a Thread network credential identifier of the Thread network credentials to delete. Based on the received third message, the TCDS validates the user identity, queries the TCDS database for Thread credential identifiers owned by the validated user, and receives the Thread credential identifiers owned by the validated user. Based on the Thread network credential identifier received in the third message, the TCDS sends a message to the TCDS database that directs the TCDS database to delete the Thread network credentials associated with the Thread network credential identifier from the TCDS database.

BRIEF DESCRIPTION OF THE DRAWINGS

Aspects of a Thread credentials distribution service are described with reference to the following drawings. The same numbers are used throughout the drawings to reference like features and components.

DETAILED DESCRIPTION

This document illustrates aspects of a Thread credentials distribution service. To interoperate in the same Thread network, Thread devices must be configured with the same Thread network credentials. To provide greater flexibility in commissioning Thread devices, cloud-based network commissioning stores Thread network credentials in the Thread credentials distribution service. The Thread credentials distribution service increases flexibility for a user by enabling the user to employ various first-party and third-party devices to commission a Thread device in network environments, such as a Matter networking environment, by securely retrieving commissioning credentials from the Thread credentials distribution service.

Example Environment

Figure 1:
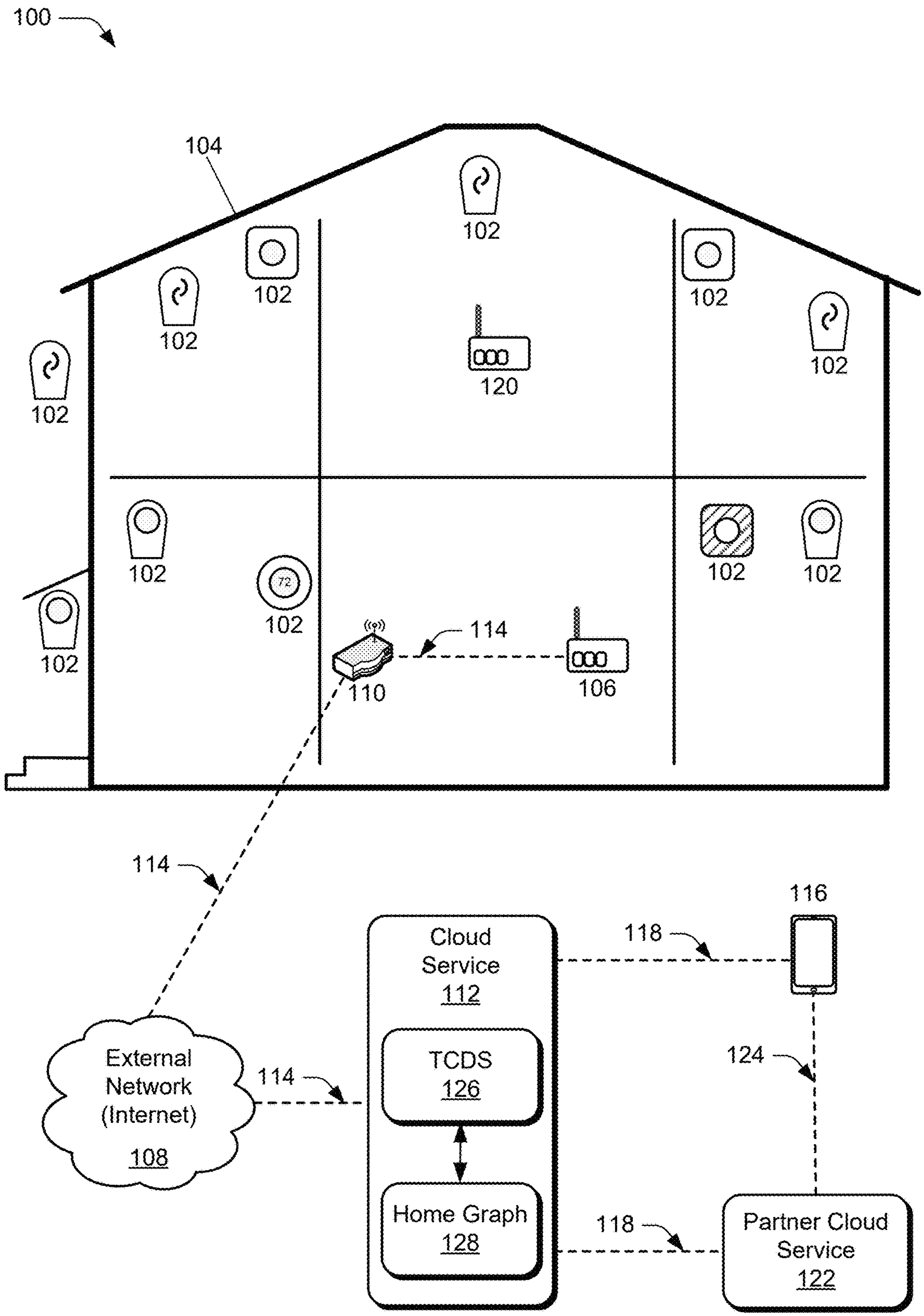
FIG. 1 illustrates an example network environment in which various aspects of a Thread credentials distribution service can be implemented.

FIG. 1 illustrates an example network environment 100 in which aspects of a Thread credentials distribution service can be implemented. The network environment 100 (e.g., a fabric network, a Thread network, a Matter network, a Weave network) includes one or more network segments that form a home area network (HAN) such as a HAN 200, described below with respect to FIG. 2. The HAN includes wireless network devices 102 that are disposed about a structure 104, such as a house, and are connected by one or more wireless and/or wired network technologies, as described below. The HAN includes a wireless network device 102 that acts as a border router 106 that connects the HAN to an external network 108 (access network 108), such as the Internet, through a home router or access point 110.

To provide user access to functions implemented using the wireless network devices 102 in the HAN, a cloud service 112 connects to the HAN via border router 106, via a secure tunnel 114 through the external network 108 (access network 108) and the access point 110. The cloud service 112 facilitates communication between the HAN and internet clients 116, such as apps on mobile devices, using a web-based application programming interface (API) 118. The cloud service 112 also manages a home graph 128 (home graph service 128) that describes connections and relationships between the wireless network devices 102, elements of the structure 104, and users and stores Thread network credentials. The Thread network credentials are accessed through a Thread Credential Distribution Service 126 (TCDS 126) that securely stores and distributes Thread network credentials. The cloud service 112 hosts controllers which orchestrate and arbitrate home automation experiences, as described in greater detail below.

The HAN may include one or more wireless network devices 102 that function as a hub 120. The hub 120 may be a general-purpose home automation hub, or an application-specific hub, such as a security hub, an energy management hub, an HVAC hub, and so forth. The functionality of a hub 120 may also be integrated into any wireless network device 102, such as a smart thermostat device, a network-enabled television, a media streaming device, or the border router 106. In addition to hosting controllers on the cloud service 112, controllers can be hosted on any hub 120 in the structure 104, such as the border router 106. A controller hosted on the cloud service 112 can be moved dynamically to the hub 120 in the structure 104, such as moving an HVAC zone controller to a newly installed smart thermostat. Hosting functionality on the hub 120 in the structure 104 can improve reliability when the user's internet connection is unreliable, can reduce latency of operations that would normally have to connect to the cloud service 112, and can satisfy system and regulatory constraints around local access between wireless network devices 102.

The wireless network devices 102 in the HAN may be from a single manufacturer that provides the cloud service 112 as well, or the HAN may include wireless network devices 102 from partners. These partners may also provide partner cloud services 122 that provide services related to their wireless network devices 102 through a partner Web API 124. The partner cloud service 122 may optionally or additionally provide services to internet clients 116 via the web-based API 118, the cloud service 112, and the secure tunnel 114.

The network environment 100 can be implemented on a variety of hosts, such as battery-powered microcontroller-based devices, line-powered devices, and servers that host cloud services. Protocols operating in the wireless network devices 102 and the cloud service 112 provide a number of services that support operations of home automation experiences in the distributed computing environment 100. These services include, but are not limited to, real-time distributed data management and subscriptions, command-and-response control, real-time event notification, historical data logging and preservation, cryptographically controlled security groups, time synchronization, network and service pairing, and software updates.

Figure 2:
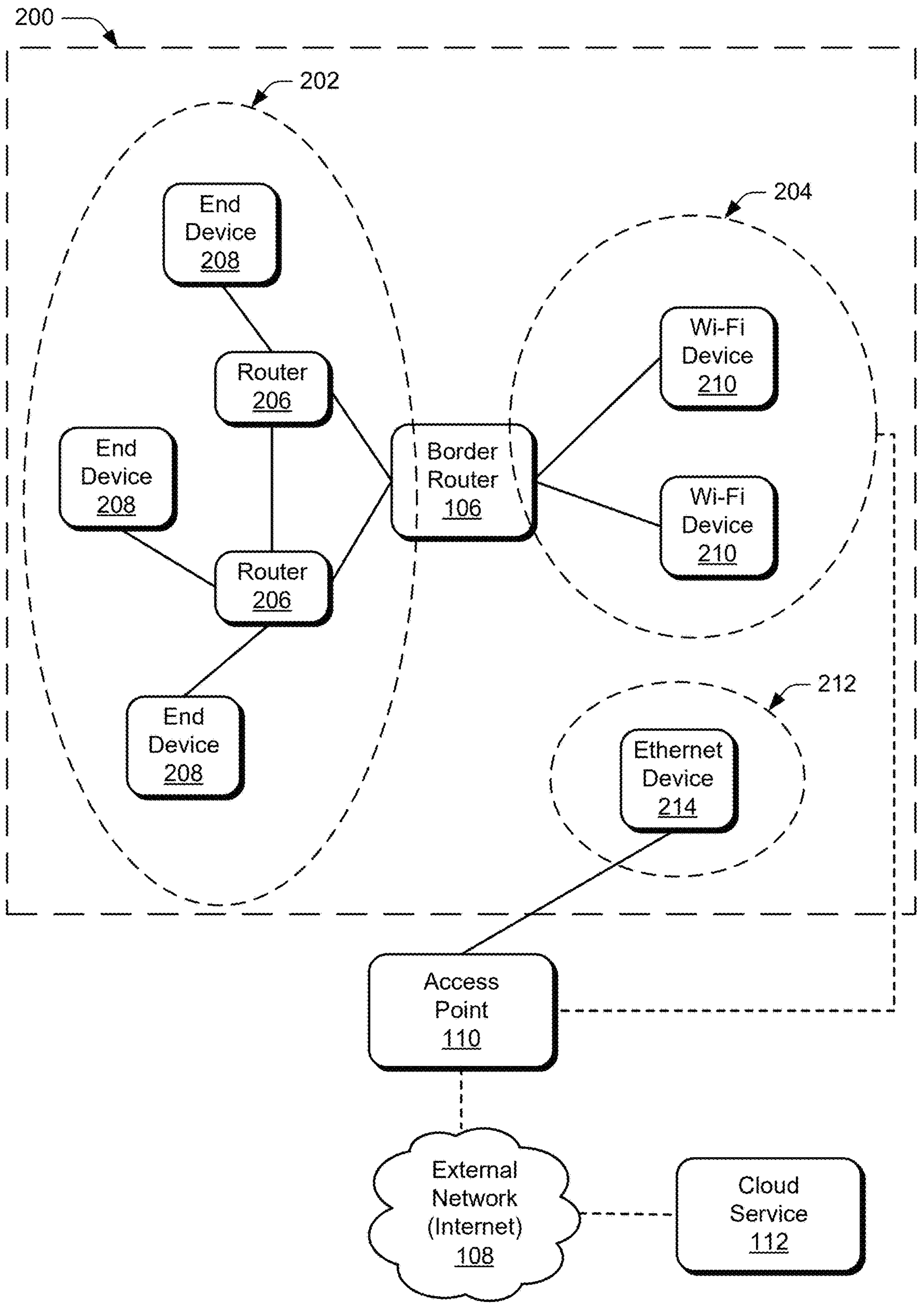
FIG. 2 illustrates an example environment in which various aspects of a Thread credentials distribution service can be implemented.

FIG. 2 illustrates an example environment (e.g., a fabric network, a Weave network, a Matter network) in which various aspects of a Thread credentials distribution service can be implemented. The home area network (HAN, Thread network) 200 may include a wireless mesh network segment 202 (e.g., a Thread network segment), a Wi-Fi network segment 204, and/or an Ethernet segment 212. The mesh network segment 202 is a Wireless Personal Area Network (WPAN) implementing the Thread Specification, in particular the Thread Specification 1.0, 1.1, 1.2, 1.3, 1.4, or any later version. For example, the mesh network segment 202 may be compatible with version 1.1, version 1.2, and/or version 1.3 of the Thread Specification. The Wi-Fi segment 204 is a Wireless Local Area Network (WLAN) implementing the IEEE 802.11 standard, in particular the IEEE 802.11 standard of 1997 and/or any later version such as 802.11b, 802.11g, 802.11n, 802.11ac, 802.11ax, 802.11ad, 802.11ay, and 802.11be. For example, the Wi-Fi segment 204 may be compatible with one or more, e.g., all, of these versions. The wireless mesh network segment 202 includes routers 206 and end devices 208. The routers 206 and the end devices 208, each include a mesh network interface for communication over the mesh network segment 202. The routers 206 receive and transmit packet data over the mesh network interface. The routers 206 also route traffic across the mesh network segment 202. The end devices 208 are devices that can communicate using the mesh network segment 202, but lack the capability, beyond simply forwarding to its parent router 206, to route traffic in the mesh network segment 202. One or more of the end devices 208 may be battery powered. For example, a battery-powered sensor is one type of end device 208. The Wi-Fi network segment 204 includes Wi-Fi devices 210. Each Wi-Fi device 210 includes a Wi-Fi network interface for communication over the Wi-Fi network segment 204. Optionally or additionally, the HAN 200 can include an Ethernet network segment 212 that includes one or more Ethernet devices 214 that connect to the border router 106 or the access point 110. The Ethernet network segment 212 may be compatible with the IEEE 802.3 standard of any version, e.g., 802.3cu or any prior version.

The border router 106 is included in the wireless mesh network segment 202 and is included in the Wi-Fi network segment 204. The border router 106 includes a mesh network interface for communication over the mesh network segment 202 and a Wi-Fi network interface for communication over the Wi-Fi network segment 204. The border router 106 routes packets between devices in the wireless mesh network segment 202 and the Wi-Fi network segment 204. The border router 106 also routes packets between devices in the HAN 200 and external network nodes (e.g., the cloud service 112) via the access network 108, such as the Internet, through a home router or access point 110.

The devices in the mesh network segment 202, the Wi-Fi network segment 204, and the Ethernet network segment 212 use standard IP routing configurations to communicate with each other through transport protocols such as the User Datagram Protocol (UDP) or the Transmission Control Protocol (TCP). When the devices in the mesh network segment 202, the Wi-Fi network segment 204 and/or the Ethernet network segment 212 are provisioned as part of a Weave network, a fabric network, or a Matter network, the devices can communicate messages over those same UDP and/or TCP transports.

Thread Credentials Distribution Service

Thread credentials (operational dataset, Thread network credentials) encode a network configuration associated with a Thread network. All Thread devices in a given network must be configured with the same Thread network credentials to function properly on the Thread network. The Thread network credentials include multiple parameters that are encoded as a variable-length byte array no larger than 254 bytes.

One operational dataset parameter, the Thread network key, is a 128-bit machine-generated shared secret used to secure all Thread network communication. While a machine-generated key helps improve security (e.g., as compared to a user-generated key), requiring a user to manually transfer a 128-bit random value via text input is not user-friendly. As a result, existing solutions may implement machine-to-machine mechanisms for Thread credentials sharing, for example using a mobile device (e.g., a smartphone, a tablet) to communicate the Thread network credentials to a new Thread device.

In addition to using a mobile app when configuring a Thread device, there are use cases where devices with on-display setup (e.g., a network-enabled television, a media streaming device) do not use a mobile device for setup. Home routers from Internet Service Providers (ISPs) are typically provisioned upon shipment and do not require setup using a mobile app. Third-party devices or systems can use a user-authenticated cloud interaction to share Thread credentials for networks that they create or retrieve Thread credentials for networks that they would like to join.

The TCDS 126 allows users to store, update, and retrieve Thread credentials. Devices accessing the TCDS 126 may or may not implement Thread. Thread devices in an established Thread network store credentials to allow other Thread devices to join the same Thread network. At the same time, Thread devices may need to retrieve credentials to join an existing Thread network.

A typical Matter Commissioner operates on a user's mobile device that does not implement Thread. Matter commissions Thread devices using Bluetooth Low Energy (BLE). In this case, the mobile device must retrieve the user's Thread credentials and provide them to the Thread device over BLE.

Figure 3:
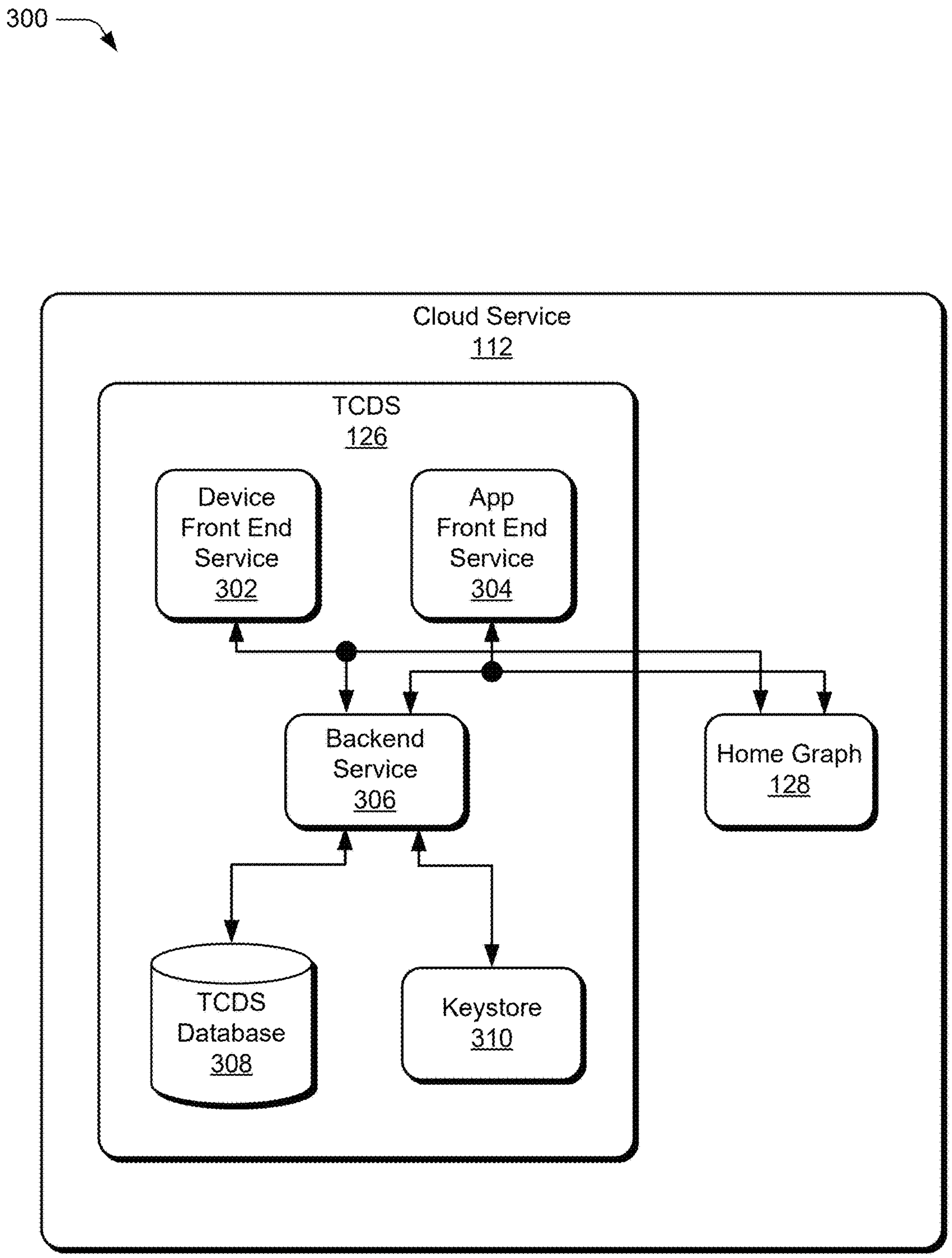
FIG. 3 illustrates an example system in which various aspects of a Thread credentials distribution service can be implemented.

FIG. 3 illustrates an example system in which various aspects of a Thread credentials distribution service can be implemented. The TCDS 126 includes a device front end service 302, an app front end service 304, a backend service, 306, a TCDS database 308, and a keystore 310.

The device front end service 302 provides access to the TCDS 126 for Thread devices that authenticate to the TCDS 126 using a device identity. The app front end service 304 provides access to the TCDS 126 for mobile devices using an app (e.g., a commissioning app) that authenticates to the TCDS 126 using a user account identity. The backend service 306 (TCDS backend service 306) executes the logic for accessing and managing Thread credentials. The TCDS database 308 stores Thread credentials and the keystore 310 holds encryption and signing keys for the TCDS 126.

In aspects, the TCDS database 308 stores a table of records of Thread credentials with a primary key (e.g., a CredentialsId, a credentials identifier, Thread credentials identifier) that is a TCDS-assigned UUID (Universally Unique Identifier) that is unique for each of the Thread credentials stored in the table. Each record in the table includes the credentials identifier, an Extended PAN ID for the Thread network, a time stamp for the credentials (e.g., active timestamp), the Thread credentials, a status indicator, a creation timestamp for the record, and a timestamp for the last modification to the record.

The home graph 128 stores information related to a structure. The home graph 128 stores information about which devices are related to a structure and which users possess management rights for the structure. The home graph 128 also stores information about the Thread credentials, which are stored in the TCDS 126, that are associated with the Thread network(s) in a structure.

The TCDS 126 provides various services to manage the storage and distribution of Thread credentials based on user identifiers or device identifiers. The TCDS 126 supports the creation of a cryptographically-secure and authenticated session for performing operations to retrieve Thread credentials from the TCDS database 308, update Thread credentials stored in the TCDS 308 database, obtain a list of Thread networks associated with a user, and delete Thread credentials stored in the TCDS database 308.

Figure 4:
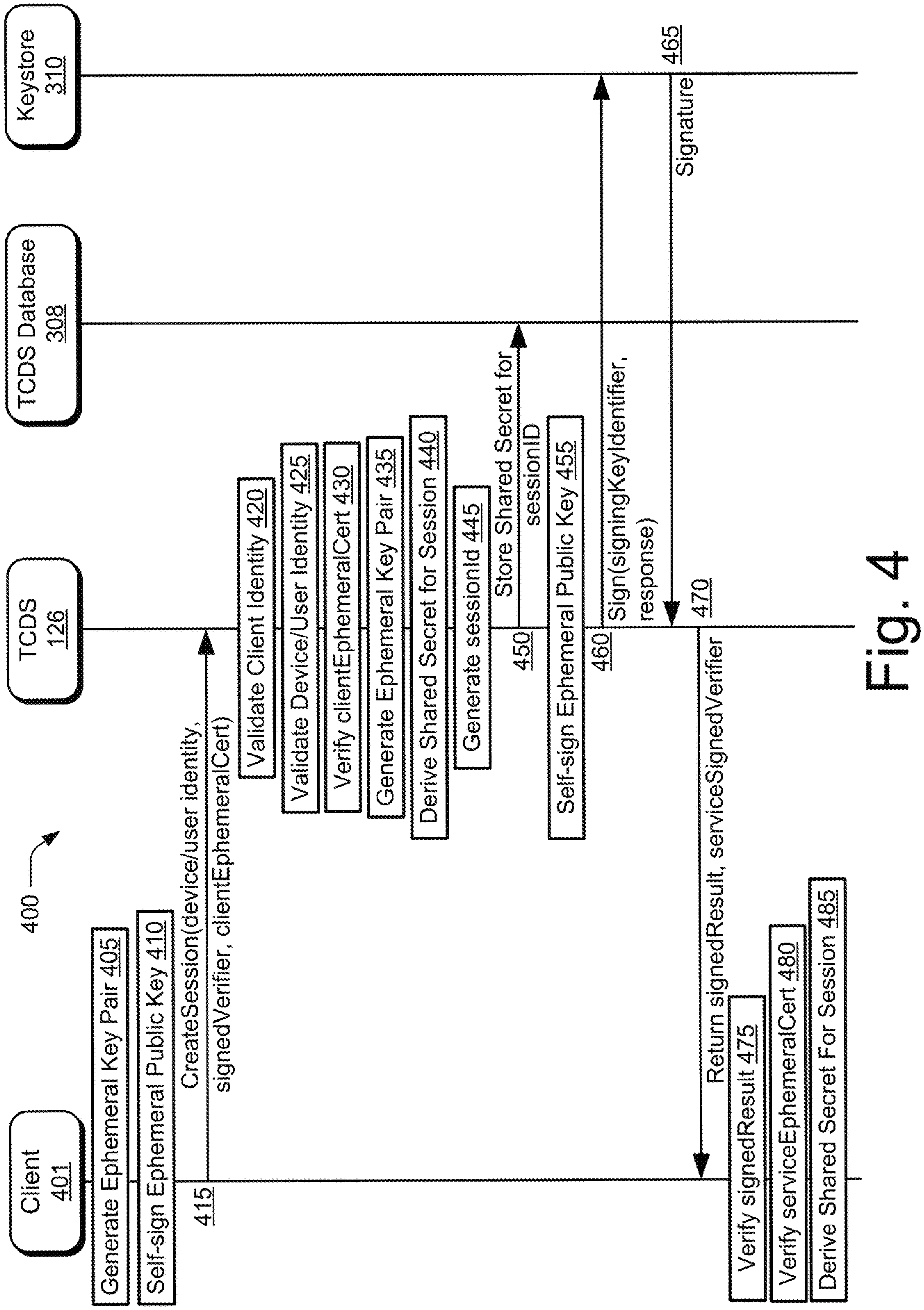
FIG. 4 illustrates data and control transactions between devices for creating a secure session in accordance with aspects of a Thread credentials distribution service.

FIG. 4 illustrates data and control transactions between devices for creating a secure session with the TCDS 126 in accordance with aspects of a Thread credentials distribution service. In this aspect, a client device 401 (e.g. a Thread device or an app on a user device) establishes an encrypted and authenticated session with the TCDS 126, using the Elliptical-Curve Diffie-Hellman (ECDH) key agreement protocol, to get, store, update, or delete Thread credentials or obtain a list of Thread networks associated with a user account (user identity).

At 405, a client 401 (a Thread device or an app on a mobile device) generates an ephemeral key pair. For example, the client 401 generates an ephemeral Elliptical Key Cryptography key pair (e.g., a 256 bit Elliptical Key Cryptography (ECC) key pair). At 410, the client 401 self-signs the ephemeral public key to authenticate the ephemeral public key to the TCDS 126. For example, if the client 401 is a Thread device, the client 401 signs the ephemeral public key with the certificate of the Thread device. In another example, if the client 401 is a mobile device, the client 401 generates attestation data over the ephemeral key pair. At 415, the client 401 sends a create session (e.g., CreateSession) message to the TCDS 126 to initiate a secure communication session. The create session message includes a device identity or user identity, a signed verifier (signedVerifier), and a client ephemeral certificate (clientEphemeralCert).

At 420, the TCDS 126 validates the identity of the client 401 by verifying the signature or attestation data over the public key. At 425, the TCDS 126 validates the device or user identity included in the create session message. At 430, the TCDS 126 verifies the client ephemeral certificate included in the create session message. At 435, the TCDS 126 generates an ephemeral key pair (e.g., an ECC 256-bit key pair) and, at 440, derives a shared secret (e.g., symmetric key) for the session. At 445, the TCDS generates a session identifier (sessionId) for the session and, at 450, stores the shared secret for the session identifier in the TCDS database 308 with the shared secret being protected by a key in the keystore 310.

At 455, the TCDS 126 self-signs the ephemeral public key with the certificate of the TCDS 126. At 460, the TCDS 126 sends a message (Sign (signingKeyIdentifier, response)) to the keystore 310 to request the keystore 310 to sign the Result (response) that will be sent to the client 401 and, at 465, the keystore 310 returns the signature (signedResult). At 470, the TCDS 126 sends the signed result (signedResult) and a signed service verifier (authentication signature) to the client 401. At 475, the client 401, verifies (authenticates) the signed result. At 480, the client 401, verifies the service ephemeral certificate (serviceEphemeralCert) and at 485 derives the shared secret for the session.

Figure 5:
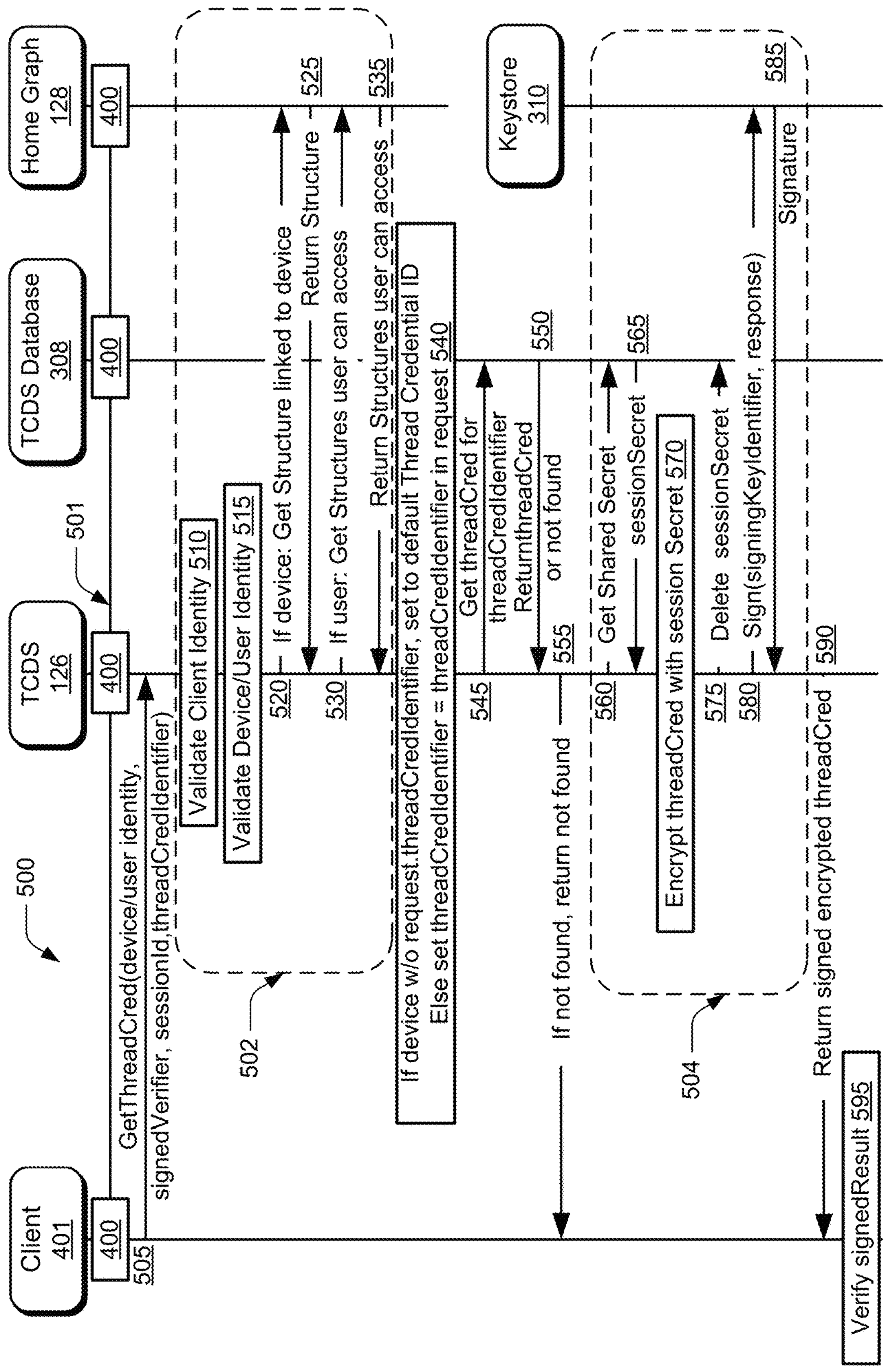
FIG. 5 illustrates data and control transactions between devices for obtaining thread credentials in accordance with aspects of a Thread credentials distribution service.

FIG. 5 illustrates data and control transactions between devices for obtaining thread credentials from the TCDS 126 in accordance with aspects of a Thread credentials distribution service. At 501, the set of signaling and control transactions included in diagram 400 are performed to create a secure session within which the Thread network credentials can be securely requested and retrieved.

At 505, the client 401 sends a Thread network credentials request message (e.g., a get ThreadCred message) to the TCDS 126 to request the Thread network credentials for a Thread network. The message includes a device identity or user identity, a signed verifier (signedVerifier), a session identifier (sessionId) and, optionally, a Thread credential identifier (threadCredIdentifier). At 510, the TCDS 126 validates the identity of the client 401 by verifying the signature or attestation data over the public key. At 515, the TCDS 126 validates the device or user identity included in the Thread network credentials request message.

At 520, if the supplied identifier is a device identifier, the TCDS 126 sends a message (a Get Structure) message to the home graph 128 to obtain a structure identifier associated with the device identifier and, at 525, the home graph 128 sends a return message (a Return Structure message) to the TCDS 126 that includes the structure identifier associated with the device identifier. Alternatively, at 530, if the supplied identifier is a user identifier, the TCDS 126 sends a message (a Get Structures) message to the home graph 128 to retrieve one or more structure identifiers that the user can access and, at 535, the home graph 128 sends a return message (a Return Structures message) to the TCDS 126 that includes the structure identifiers that the user can access.

At 540, the TCDS 126 determines if the supplied identifier is a device identifier and a Thread credentials identifier (threadCredIdentifier) was omitted. If the Thread credentials identifier was omitted, the TCDS 126 sets the Thread credentials identifier (threadCredIdentifier) to the value of the Thread credentials identifier for the default Thread network of the structure. Otherwise, the TCDS 126 uses the Thread credentials identifier (threadCredIdentifier) included in the received the Thread network credentials request message (the get ThreadCred message).

At 545, the TCDS 126 sends a request for the Thread credentials associated with the Thread credentials identifier (Get threadCred for threadCredIdentifier) to the TCDS database 308 and, at 550, the TCDS database 308 sends the Thread credentials associated with the Thread credentials identifier (Return threadCred), or “not found” if there are no Thread credentials associated with the Thread credentials identifier stored in the TCDS database 308. If the Thread credentials are not found, the TCDS 126 sends an indication to the client 401 that the Thread credentials are not found.

At 560, if the Thread credentials have been retrieved, the TCDS 126, requests the shared secret (Get Shared Secret) for the session from the TCDS database at 450. At 565, the TCDS database 308 sends the shared secret (sessionSecret) for the session to the TCDS 126. At 570, the TCDS 126 encrypts the Thread credentials (threadCred) with the session secret and, at 575, deletes the session secret from the TCDS database 308. At 580, the TCDS 126 sends a message (Sign (signingKeyIdentifier, response)) to the keystore 310 to request the keystore 310 to sign the encrypted Thread network credentials that will be sent to the client 401 and, at 585, the keystore 310 returns the signature (signedResult). At 590, the TCDS 126 sends the signed, encrypted Thread credentials to the client 401 and, at 595, the client 401 verifies the signed result (verify signedResult) as described with respect to 480, above.

Figure 6:
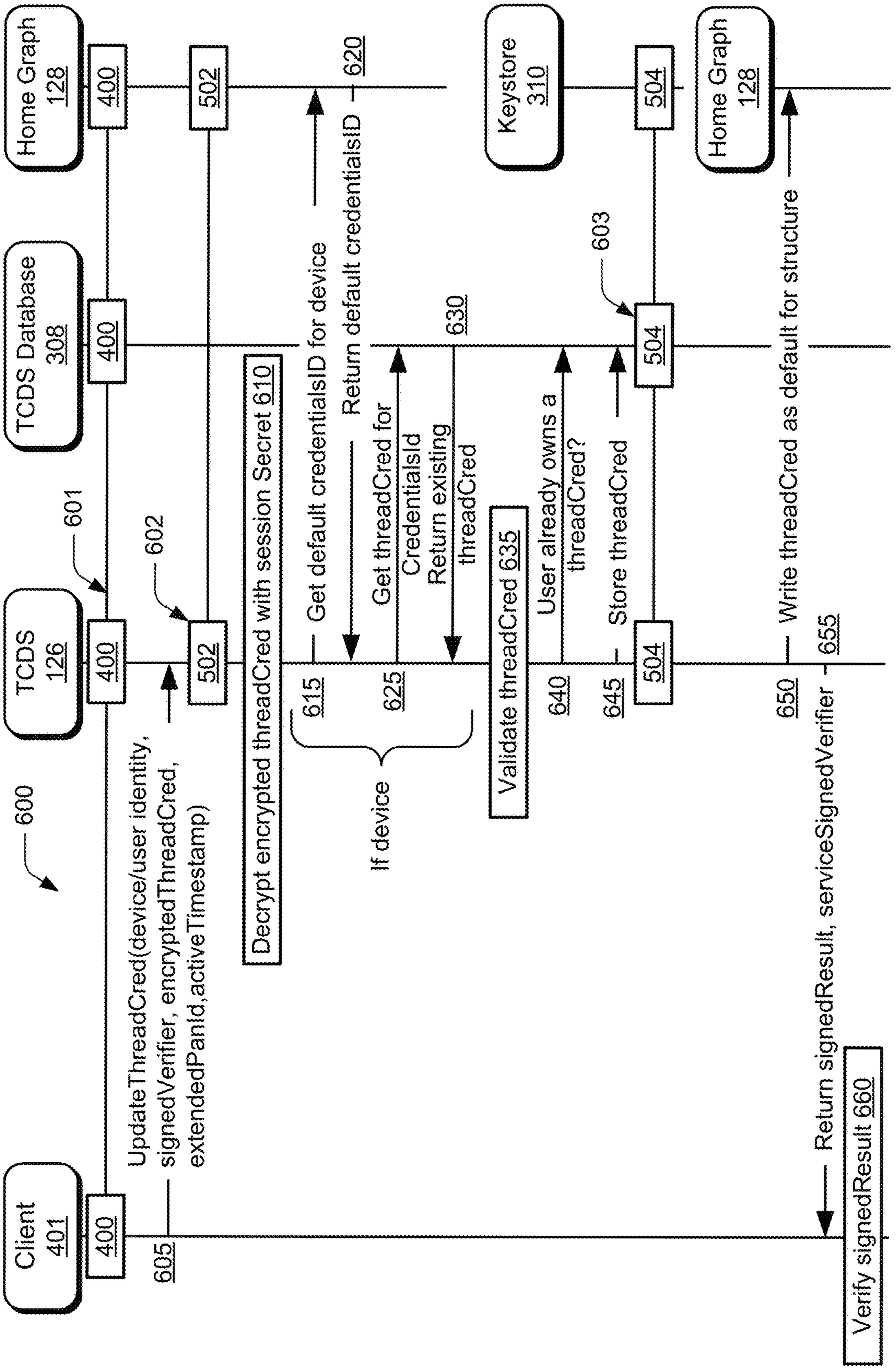
FIG. 6 illustrates data and control transactions between devices for updating thread credentials in accordance with aspects of a Thread credentials distribution service.

FIG. 6 illustrates data and control transactions between devices for updating thread credentials in the TCDS 126 in accordance with aspects of a Thread credentials distribution service. At 601, the set of signaling and control transactions included in diagram 400 are performed to create a secure session within which the Thread network credentials can be securely requested and retrieved.

At 605, the client 401 sends a Thread network credentials update message (e.g., an UpdateThreadCred message) to the TCDS 126 to update the Thread network credentials for a Thread network. The message includes a device identity or user identity, a signed verifier (signedVerifier), encrypted Thread credentials (encryptedThreadCred) an extended PAN ID (extendedPanId) for the Thread network, and an active timestamp (activeTimestamp). At 602, the set of signaling and control transactions included in sub-diagram 502 are performed to create and validate the client and device or user identity. At 610, the TCDS 126 decrypts the encrypted Thread credentials (encrypted threadCred) with the session secret.

If the identifier is for a device, steps 615-630 are performed by the TCDS 126. At 615, the TCDS 126 requests the default credentials identifier for the device (Get default credentialsID for device) from the home graph 128. At 620, the home graph 128 returns the default credential identifier for the device (Get default credentialsID for device) to the TCDS 126. At 625, the TCDS 126 requests the Thread credentials for the returned credentials identifier (Get threadCred for credentialsID) from the TCDS database 308. At 630, the TCDS database 308 returns the Thread credentials associated with the credential identifier to the TCDS 126.

At 635, the TCDS 126 validates the Thread credentials (threadCred). For example, the TCDS 126 validates the Thread credentials by comparing the received Thread credentials to the Thread credentials existing in the TCDS database 380 to determine if the received Thread credentials have a higher version number than the existing Thread credentials. At 640, if a user identity was received at 605, the TCDS 126 queries the TCDS database 308 to determine if the user already owns Thread credentials (a threadCred) with the Extended PAN ID, active timestamp, and Thread credentials (extendedPanId, activeTimestamp, and threadCred). If a device identity was received at 605, the TCDS 126 stores the Thread credentials for the credentialsId, extended PAN ID, and active timestamp, at 645, if the Thread credentials are new. At 645, if a user identity was received at 605 and if the user already owns Thread credentials, the TCDS 126 checks the TCDS database 308 to determine the number of Thread credentials owned by the user and that the number of owned Thread credentials does not exceed a threshold value. If the threshold is not exceeded, the TCDS 126 stores the Thread credentials for the credentialsId, extended PAN ID, and active timestamp. If the Thread credentials are new, the TCDS 126 increments the user's count of owned Thread credentials, and updates the owner of the Thread credential (threadCred). At 603, the set of signaling and control transactions included in sub-diagram 504 are performed to encrypt and sign the result of updating the Thread credentials.

At 650, the TCDS 126 writes the Thread credentials identifier (threadCredId) to the home graph 128 as the default Thread credentials for the structure only if the received identity is a device identity or a user identity with a device identity. If the received identity is a device identity or a user identity with a device identity, the Thread Credential Identifier is set as the default for the device's structure. At 655, the TCDS 126 returns the signed result and service signed verifier (signedResult, serviceSignedVerifier) to the client 401 and, at 660, the client 401 verifies the signed result (verify signedResult) as described with respect to 480, above.

Figure 7:
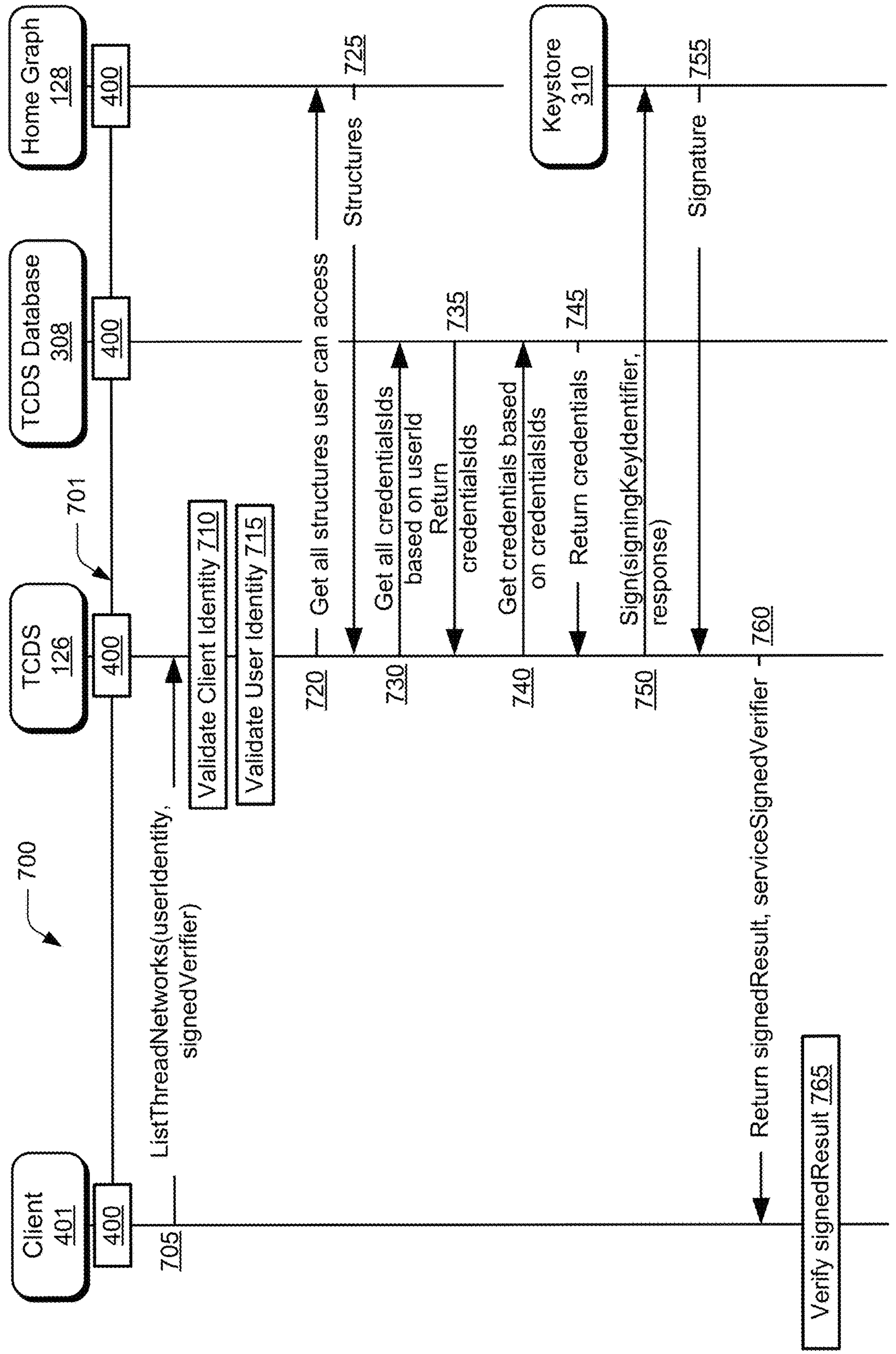
FIG. 7 illustrates data and control transactions between devices for obtaining a list of Thread networks for a user in accordance with aspects of a Thread credentials distribution service.

FIG. 7 illustrates data and control transactions between devices for obtaining a list of Thread networks for a user from the TCDS 126 in accordance with aspects of Thread credentials distribution service. At 701, the set of signaling and control transactions included in diagram 400 are performed to create a secure session within which the Thread network credentials can be securely requested and retrieved.

At 705, the client 401 sends a message to request a list of Thread networks associated with a user identity (e.g., a ListThreadNetworks message) to the TCDS 126 to request the list of Thread networks. The message includes a user identity (userIdentity) and a signed verifier (signedVerifier). At 710, the TCDS 126 validates the identity of the client 401 by verifying the signature or attestation data over the public key. At 715, the TCDS 126 validates the user identity included in the Thread network credentials request message.

At 720, the TCDS 126 sends a message to the home graph 128 to request all the structures a user can access and, at 725, the home graph 128 returns the structures that are associated with the user identity to the TCDS 126. At 730, the TCDS 126 queries all the credential identifiers that the user owns (all the credential identifiers for which the user has previously made the TCDS::Update ThreadCred call) and, at 735, the TCDS database 308 returns the credential identifiers (credentialsIds) for the query.

At 740, TCDS 126 queries the TCDS database 380 to obtain credentials for all the credential identifiers (the credentials identifiers from the Home Graph Structures response at 725 plus the credentials identifiers from the TCDS DB response in 735). At 745, the TCDS database 308 returns the credentials (Thread network credentials) for the query.

At 750, the TCDS 126 sends a message (Sign(signingKeyIdentifier, response)) to the keystore 310 to request the keystore 310 to sign the list of Thread networks that include the credentials identifier(s), extended PAN ID(s), and active timestamp(s), that will be sent to the client 401 and, at 755, the keystore 310 returns the signature (signedResult). At 760, the TCDS 126 sends the signed list of Thread networks to the client 401 and, at 765, the client 401 verifies the signed result (verify signedResult) as described with respect to 480, above.

Figure 8:
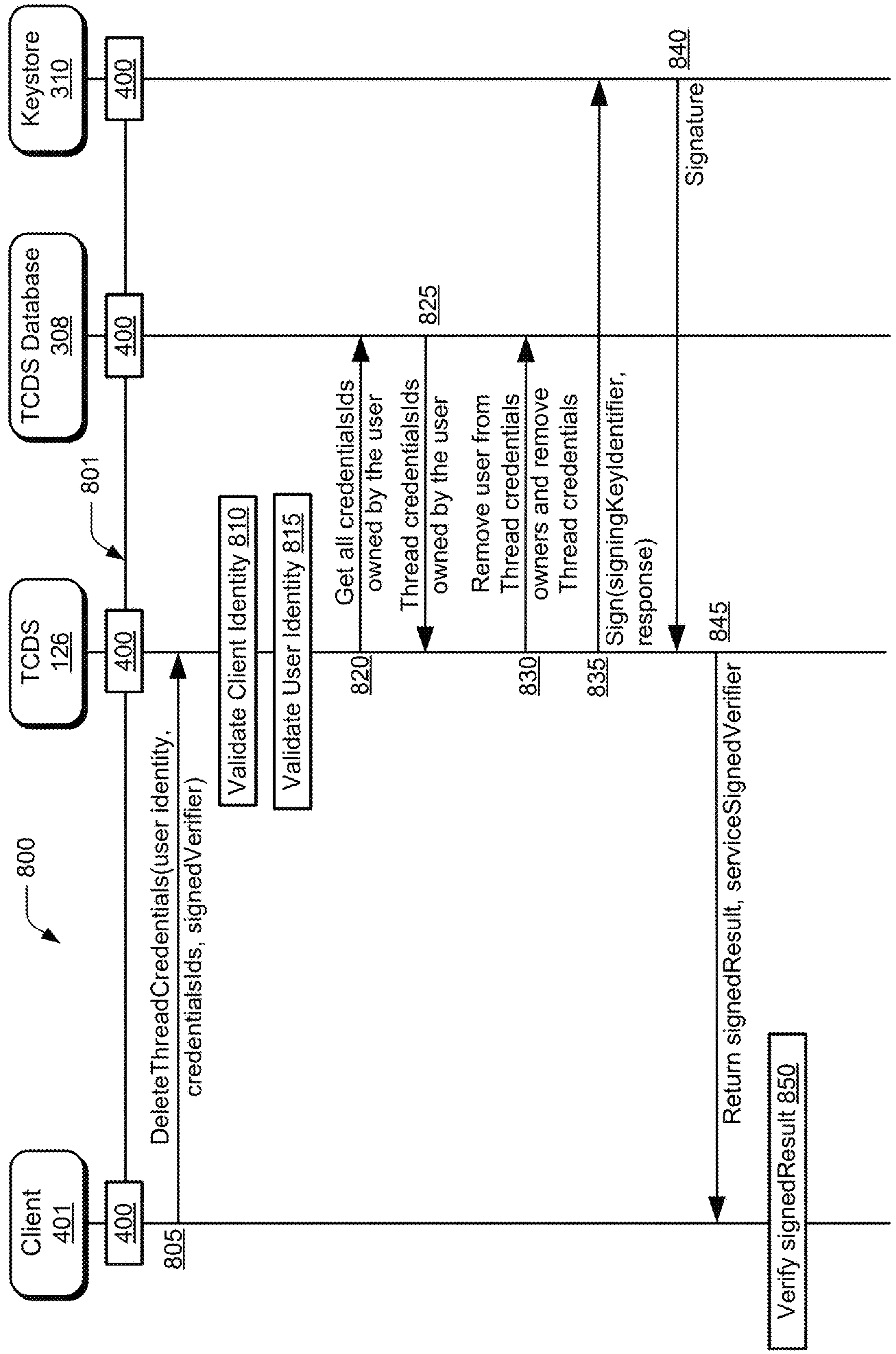
FIG. 8 illustrates data and control transactions between devices for deleting Thread credentials in accordance with aspects of a Thread credentials distribution service.

FIG. 8 illustrates data and control transactions between devices for deleting Thread credentials from the TCDS 126 in accordance with aspects of a Thread credentials distribution service. At 801, the set of signaling and control transactions included in diagram 400 are performed to create a secure session within which the Thread network credentials can be securely deleted.

At 805, the client 401 sends a message to delete a set of Thread credentials (e.g., a DeleteThreadCredentials message) to the TCDS 126. The message includes a user identity (userIdentity), credential identifiers (credentialsIds), and a signed verifier (signedVerifier). At 810, the TCDS 126 validates the identity of the client 401 by verifying the signature or attestation data over the public key. At 815, the TCDS 126 validates the user identity included in the Thread network credentials request message.

At 820, the TCDS 126 queries all the credential identifiers (credentialsIds) owned by the user (associated with the user identity) from the TCDS database 308 and, at 825, the TCDS database 308 returns the credential identifiers (credentialsIds) for the query. At 830, the TCDS 126 instructs the TCDS database 308 to remove the user from the Thread credentials and, if this results in no owners for the Thread credentials, the TCDS database 308 also removes the Thread credentials from the database.

At 835, the TCDS 126 sends a message (Sign (signingKeyIdentifier, response)) to the keystore 310 to request the keystore 310 to sign the signed list of the one or more deleted Thread credential identifiers that will be sent to the client 401 and, at 840, the keystore 310 returns the signature (signedResult). At 845, the TCDS 126 sends the signed list of the one or more deleted Thread credential identifiers to the client 401 and, at 850, the client 401 verifies the signed result (verify signedResult) as described with respect to 480, above.

Example Methods

Example methods 900-1100 are described with reference to FIGS. 9-11 in accordance with one or more aspects of a Thread credentials distribution service. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the method blocks are described is not intended to be construed as a limitation, and any number of the described method blocks can be combined in any order or skipped to implement a method or an alternate method.

Figure 9:
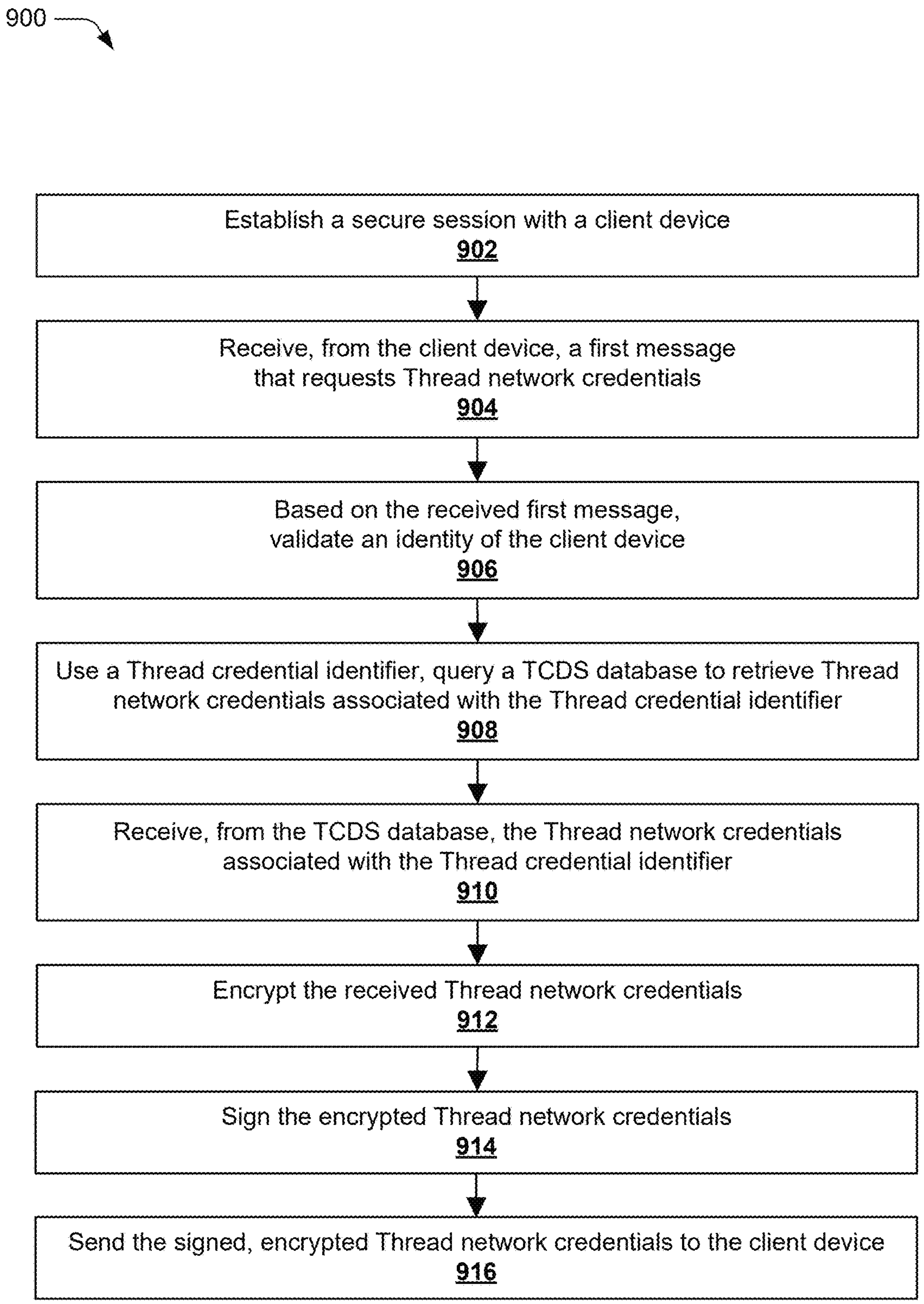
FIG. 9 illustrates an example method for a network node in accordance with one or more aspects of the techniques described herein.

FIG. 9 illustrates example method(s) 900 of a Thread credentials distribution service as generally related to obtaining Thread network credentials from a TCDS. At block 902, a Thread Credential Distribution Service (TCDS) establishes a secure session with a client device. For example, a TCDS (e.g., the TCDS 126) establishes a secure session (e.g., a secure session established using an Elliptic-curve Diffie-Hellman (ECDH) key agreement protocol) with a client (e.g., the client 401).

At 904, the TCDS receives a first message requesting credentials for a Thread network. For example, a TCDS (e.g., the TCDS 126) receives a first message that requests Thread network credentials. For example, the TCDS 126 receives a first message (e.g., a get thread credentials message, a GetThreadCred message).

At 906, based on the receiving the first message, the TCDS validates an identity of the client device. For example, the TCDS 126 validates the identity of the client 401 by verifying a signature of, or attestation data over, a public key generated during the establishment.

At 908, using a Thread credential identifier, the TCDS queries a TCDS database to retrieve Thread network credentials associated with the Thread credential identifier received in the first message. For example, using a Thread credential identifier (e.g., a threadCredIdentifier), the TCDS 126 queries a TCDS database (e.g., the TCDS database 308) to retrieve the Thread network credentials associated with the Thread credential identifier received in the first message.

At 910, the TCDS receives, from the TCDS database, the Thread network credentials associated with the Thread credential identifier. For example, the TCDS 126 receives, from the TCDS database 308, the Thread network credentials associated with the Thread credential identifier.

At 912, the TCDS encrypts the received Thread network credentials. For example, the TCDS 126 encrypts the received Thread network credentials using a session secret generated during the establishment of the secure session.

At 914, the TCDS signs the encrypted Thread network credentials. For example, the TCDS 126 signs the encrypted Thread network credentials using a signing key generated during the establishment of the secure session.

At 916, the TCDS sends the signed, encrypted Thread network credentials to the client device. For example, the TCDS 126 sends the signed, encrypted Thread network credentials to the client device 401.

Figure 10:
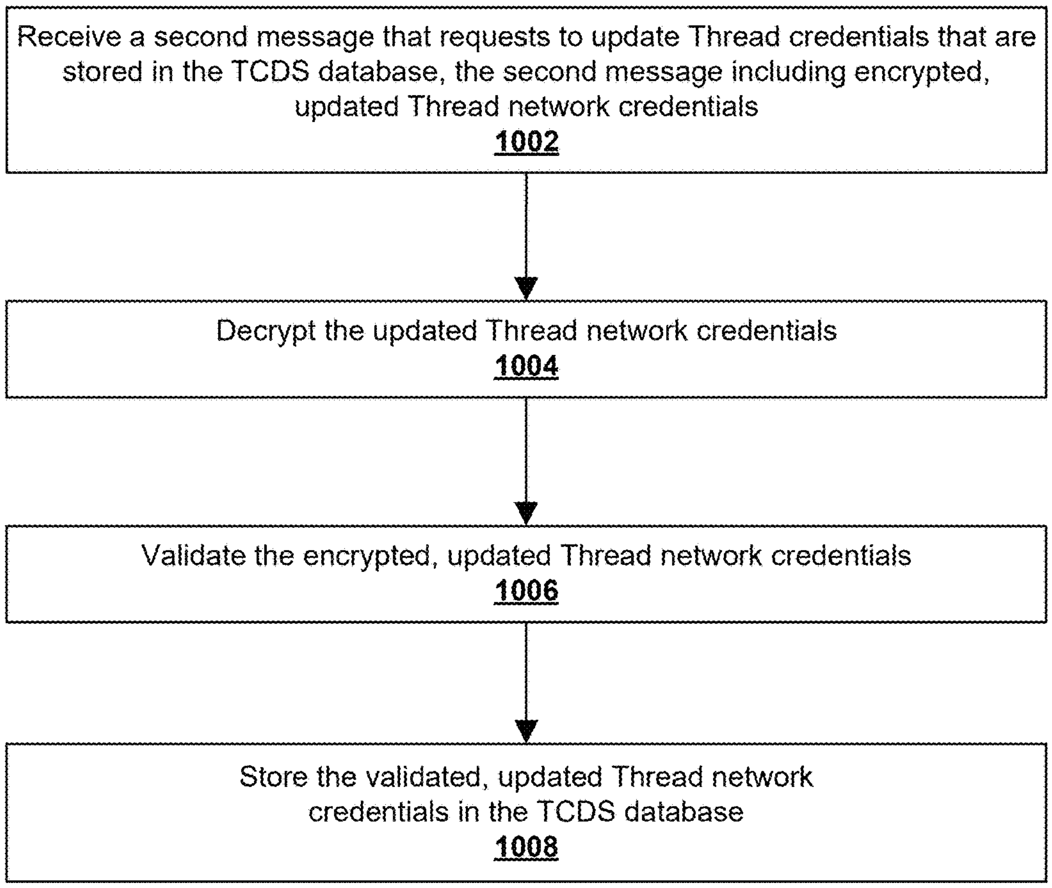
FIG. 10 illustrates an example method for a network node in accordance with one or more aspects of the techniques described herein.

FIG. 10 illustrates example method(s) 1000 of a Thread credentials distribution service as generally related to updating Thread network credentials stored by the TCDS. At block 1002, a Thread Credential Distribution Service (TCDS) receives a second message that requests to update Thread credentials that are stored in the TCDS database, the second message including encrypted, updated Thread network credentials. For example, a TCDS (e.g., the TCDS 126) receives a second message (e.g., a Thread network credentials update message, an UpdateThreadCred message) from a client (e.g., the client 401) requesting to update Thread credentials that are stored in the TCDS database (e.g., the TCDS database 308), the second message including encrypted, updated Thread network credentials.

At 1004, the TCDS decrypts the updated Thread network credentials. For example, the TCDS 126 decrypts the updated Thread network credentials using a session secret generated during the establishment of the secure session.

At 1006, the TCDS validates the decrypted, updated Thread network credentials. For example, the TCDS 126 validates the decrypted, updated Thread network credentials by comparing the received Thread credentials to the Thread credentials existing in the TCDS database (e.g., TCDS database 380) to determine if the received Thread credentials have a higher version number than the existing Thread credentials as described at 635.

At 1008, the TCDS stores the validated, updated Thread network credentials in the TCDS database. For example, the TCDS 126 stores the validated, updated Thread network credentials in the TCDS database 308.

Figure 11:
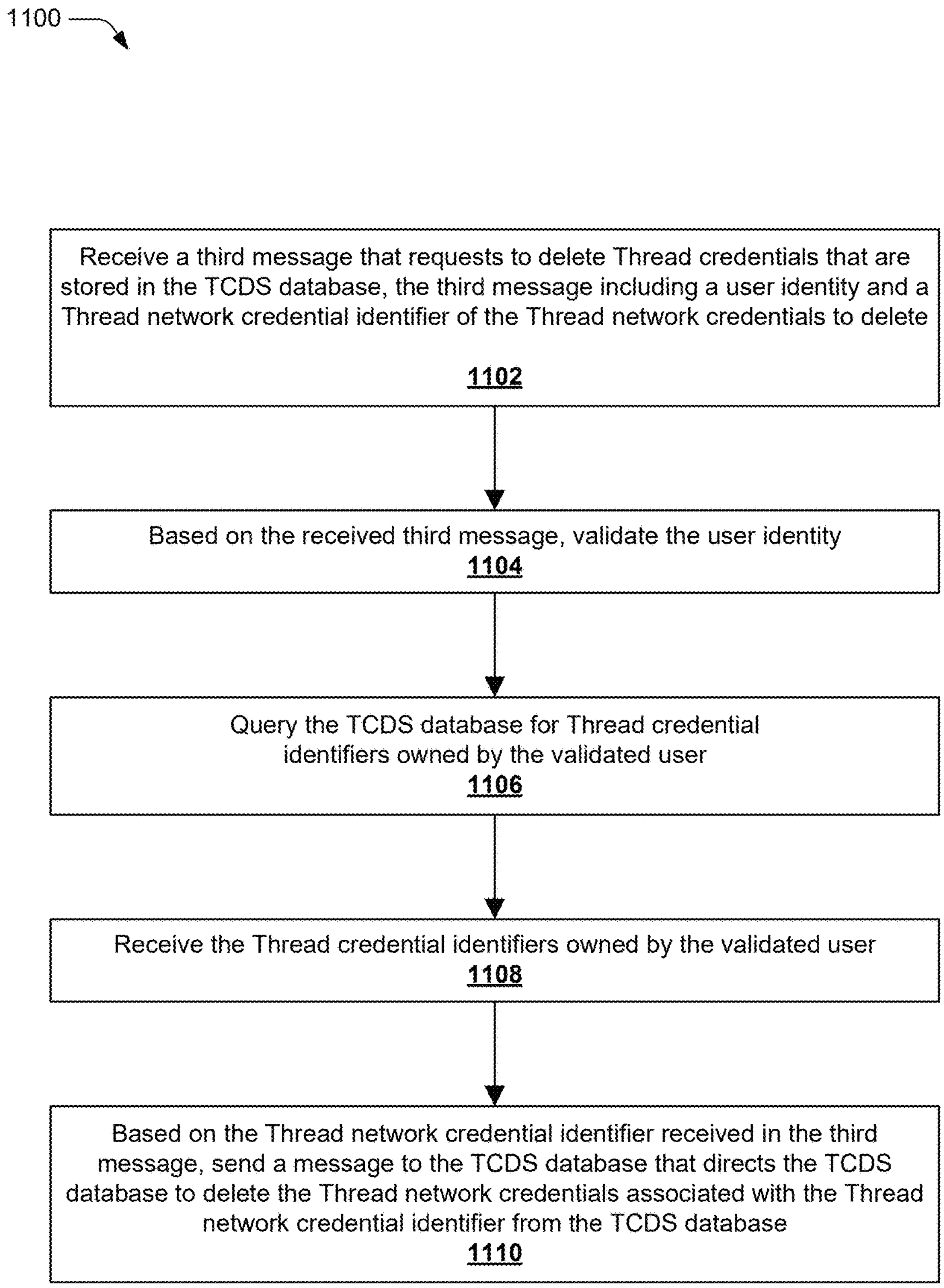
FIG. 11 illustrates an example method for a network node in accordance with one or more aspects of the techniques described herein.

FIG. 11 illustrates example method(s) 1100 of a Thread credentials distribution service as generally related to deleting Thread credentials from the TCDS. At block 1102, the TCDS receives a third message that requests to delete Thread credentials that are stored in the TCDS database, the third message including a user identity and a Thread network credential identifier of the Thread network credentials to delete. For example, the TCDS (e.g., the TCDS 126) receives a third message from a client (e.g., the client 401) that requests to delete Thread credentials that are stored in the TCDS database (e.g., the TCDS database 308), the third message including a user identity and a Thread network credential identifier of the Thread network credentials to delete.

At 1104, based on the received third message, the TCDS validates the user identity. For example, based on the received third message, the TCDS 126 validates the user identity of the client 401 by verifying a signature, or attestation data over the public key, based on establishing the secure session at 400.

At 1106, the TCDS queries the TCDS database for Thread credential identifiers owned by the validated user. For example, the TCDS 126 queries the TCDS database 308 for Thread credential identifiers owned by the validated user.

At 1108, the TCDS receives the Thread credential identifiers owned by the validated user. For example, the TCDS 126 receives the Thread credential identifiers owned by the validated user from the TCDS database 308.

At 1110, based on the Thread network credential identifier received in the third message, the TCDS sends a message to the TCDS database that directs the TCDS database to delete the Thread network credentials associated with the Thread network credential identifier from the TCDS database. For example, based on the Thread network credential identifier received in the third message, the TCDS 126 sends a message to the TCDS database 308 that directs the TCDS database 308 to delete the Thread network credentials associated with the Thread network credential identifier from the TCDS database 308.

Example Environments and Devices

Figure 12:
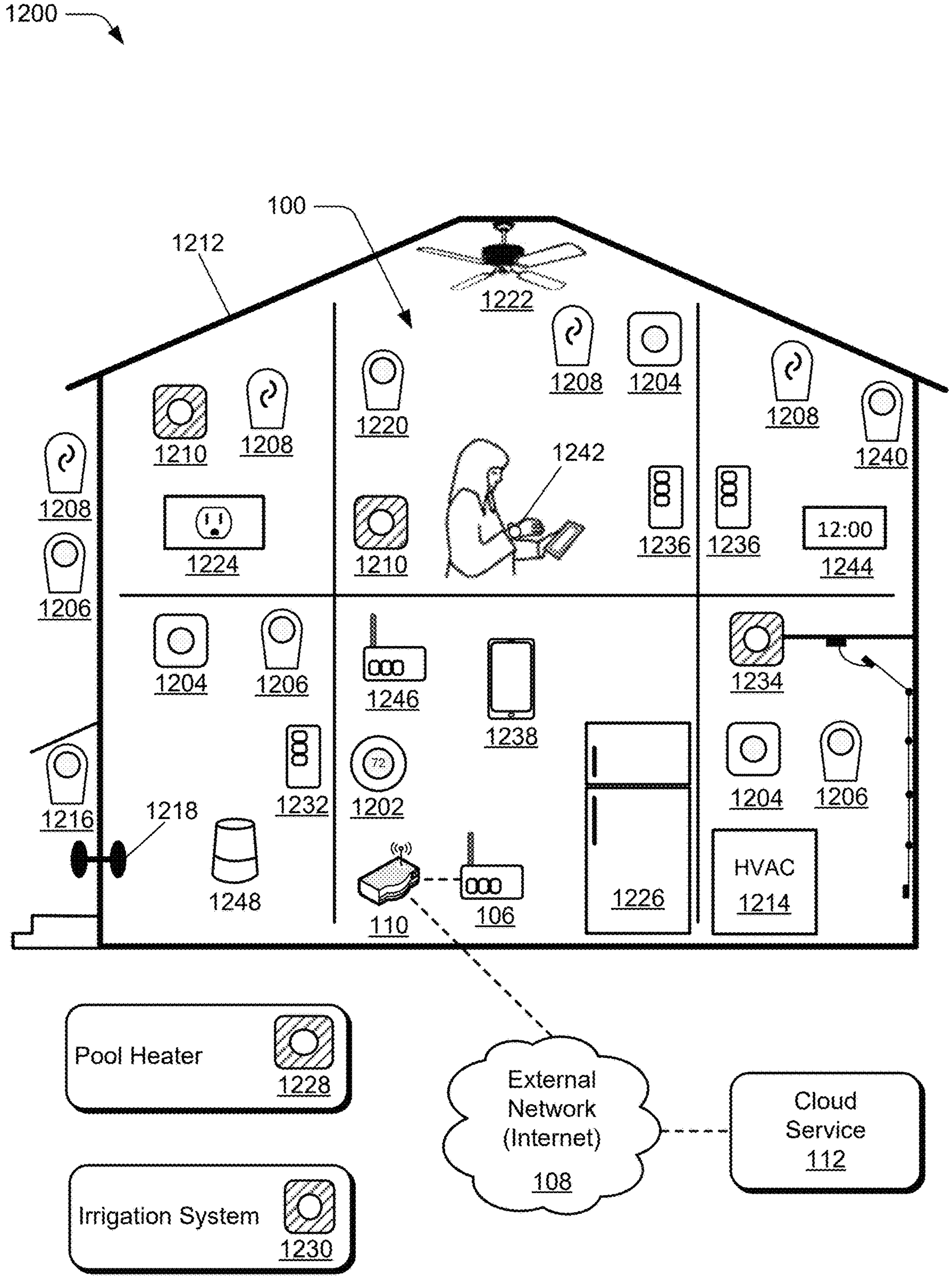
FIG. 12 illustrates an example environment in which aspects of the techniques described herein can be implemented.

FIG. 12 illustrates an example environment 1200 in which aspects of a Thread credentials distribution service can be implemented. Generally, the environment 1200 includes the home area network (HAN) 200 implemented as part of a home or other type of structure with any number of wireless network devices that are configured for communication in a wireless network. For example, the wireless network devices can include a thermostat 1202, hazard detectors 1204 (e.g., for smoke and/or carbon monoxide), cameras 1206 (e.g., indoor and outdoor), lighting units 1208 (e.g., indoor and outdoor), and any other types of wireless network devices 1210 that are implemented inside and/or outside of a structure 1212 (e.g., in a home environment), such as a network-enabled television or a media streaming device. In this example, the wireless network devices can also include any of the previously described devices, such as a border router 106, as well as any of the devices implemented as a router device 206, and/or as an end device 208.

In the environment 1200, any number of the wireless network devices can be implemented for wireless interconnection to wirelessly communicate and interact with each other. The wireless network devices are modular, intelligent, multi-sensing, network-connected devices that can integrate seamlessly with each other and/or with a central server or a cloud-computing system to provide any of a variety of useful automation objectives and implementations. An example of a wireless network device that can be implemented as any of the devices described herein is shown and described with reference to FIG. 13.

In implementations, the thermostat 1202 may include a Nest® Learning Thermostat that detects ambient climate characteristics (e.g., temperature and/or humidity) and controls a HVAC system 1214 in the home environment. The learning thermostat 1202 and other network-connected devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 1204 can be implemented to detect the presence of a hazardous substance or a substance indicative of a hazardous substance (e.g., smoke, fire, or carbon monoxide). In examples of wireless interconnection, a hazard detector 1204 may detect the presence of smoke, indicating a fire in the structure, in which case the hazard detector that first detects the smoke can broadcast a low-power wake-up signal to all of the connected wireless network devices. The other hazard detectors 1204 can then receive the broadcast wake-up signal and initiate a high-power state for hazard detection and to receive wireless communications of alert messages. Further, the lighting units 1208 can receive the broadcast wake-up signal and activate in the region of the detected hazard to illuminate and identify the problem area. In another example, the lighting units 1208 may activate in one illumination color to indicate a problem area or region in the structure, such as for a detected fire or break-in, and activate in a different illumination color to indicate safe regions and/or escape routes out of the structure.

In various configurations, the wireless network devices 1210 can include an entryway interface device 1216 that functions in coordination with a network-connected door lock system 1218, and that detects and responds to a person's approach to or departure from a location, such as an outer door of the structure 1212. The entryway interface device 1216 can interact with the other wireless network devices based on whether someone has approached or entered the smart-home environment. An entryway interface device 1216 can control doorbell functionality, announce the approach or departure of a person via audio or visual means, and control settings on a security system, such as to activate or deactivate the security system when occupants come and go. The wireless network devices 1210 can also include other sensors and detectors, such as to detect ambient lighting conditions, detect room-occupancy states (e.g., with an occupancy sensor 1220), and control a power and/or dim state of one or more lights. In some instances, the sensors and/or detectors may also control a power state or speed of a fan, such as a ceiling fan 1222. Further, the sensors and/or detectors may detect occupancy in a room or enclosure and control the supply of power to electrical outlets or devices 1224, such as if a room or the structure is unoccupied.

The wireless network devices 1210 may also include connected appliances and/or controlled systems 1226, such as refrigerators, stoves and ovens, washers, dryers, air conditioners, pool heaters 1228, irrigation systems 1230, security systems 1232, and so forth, as well as other electronic and computing devices, such as televisions, entertainment systems, computers, intercom systems, garage-door openers 1234, ceiling fans 1222, control panels 1236, and the like. When plugged in, an appliance, device, or system can announce itself to the home area network as described above and can be automatically integrated with the controls and devices of the home area network, such as in the home. It should be noted that the wireless network devices 1210 may include devices physically located outside of the structure, but within wireless communication range, such as a device controlling a swimming pool heater 1228 or an irrigation system 1230.

As described above, the HAN 200 includes a border router 106 that interfaces for communication with an external network, outside the HAN 200. The border router 106 connects to an access point 110, which connects to the access network 108, such as the Internet. A cloud service 112, which is connected via the access network 108, provides services related to and/or using the devices within the HAN 200. By way of example, the cloud service 112 can include applications for connecting end user devices 1238, such as smartphones, tablets, and the like, to devices in the home area network, processing and presenting data acquired in the HAN 200 to end users, linking devices in one or more HANs 200 to user accounts of the cloud service 112, provisioning and updating devices in the HAN 200, and so forth. For example, a user can control the thermostat 1202 and other wireless network devices in the home environment using a network-connected computer or portable device, such as a mobile phone or tablet device. Further, the wireless network devices can communicate information to any central server or cloud-computing system via the border router 106 and the access point 110. The data communications can be carried out using any of a variety of custom or standard wireless protocols (e.g., Wi-Fi, ZigBee for low power, 6LoWPAN, Thread, etc.) and/or by using any of a variety of custom or standard wired protocols (CAT6 Ethernet, HomePlug, etc.).

Any of the wireless network devices in the HAN 200 can serve as low-power and communication nodes to create the HAN 200 in the home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the home area network. The wireless network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light, and activate the light source when the ambient light sensor 1240 detects that the room is dark and when the occupancy sensor 1220 detects that someone is in the room. Further, the sensor can include a low-power wireless communication chip (e.g., an IEEE 802.15.4 chip, a Thread chip, a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the home area network, from node to node (e.g., network-connected device to network-connected device) within the home environment as well as over the Internet to a central server or cloud-computing system.

In other configurations, various ones of the wireless network devices can function as "tripwires" for an alarm system in the home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the home area network. In other implementations, the home area network can be used to automatically turn on and off the lighting units 1208 as a person transitions from room to room in the structure. For example, the wireless network devices can detect the person's movement through the structure and communicate corresponding messages via the nodes of the home area network. Using the messages that indicate which rooms are occupied, other wireless network devices that receive the messages can activate and/or deactivate accordingly. As referred to above, the home area network can also be utilized to provide exit lighting in the event of an emergency, such as by turning on the appropriate lighting units 1208 that lead to a safe exit. The light units 1208 may also be turned-on to indicate the direction along an exit route that a person should travel to safely exit the structure.

The various wireless network devices may also be implemented to integrate and communicate with wearable computing devices 1242, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other wireless network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the wireless network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the home area network, conforming to the wireless interconnection protocols for communicating on the home area network.

The wireless network devices 1210 may also include a network-connected alarm clock 1244 for each of the individual occupants of the structure in the home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the home area network based on a unique signature of the person, which is determined based on data obtained from sensors located in the wireless network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 1202 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other wireless network devices can use the data to provide other automation objectives, such as adjusting the thermostat 1202 so as to pre-heat or cool the environment to a desired setting and turning-on or turning-off the lights 1208.

In implementations, the wireless network devices can also be utilized for sound, vibration, and/or motion sensing such as to detect running water and determine inferences about water usage in a home environment based on algorithms and mapping of the water usage and consumption. This can be used to determine a signature or fingerprint of each water source in the home and is also referred to as "audio fingerprinting water usage." Similarly, the wireless network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

The environment 1200 may include one or more wireless network devices that function as a hub 1246. The hub 1246 may be a general-purpose home automation hub, or an application-specific hub, such as a security hub, an energy management hub, an HVAC hub, and so forth. The functionality of a hub 1246 may also be integrated into any wireless network device, such as a network-connected thermostat device or the border router 106. Hosting functionality on the hub 1246 in the structure 1212 can improve reliability when the user's internet connection is unreliable, can reduce latency of operations that would normally have to connect to the cloud service 112, and can satisfy system and regulatory constraints around local access between wireless network devices.

Additionally, the example environment 1200 includes a network-connected speaker (network-connected assistant device) 1248. The network-connected speaker 1248 provides voice assistant services that include providing voice control of network-connected devices. The functions of the hub 1246 may be hosted in the network-connected speaker 1248. The network-connected speaker 1248 can be configured to communicate via the wireless mesh network 202, the Wi-Fi network 204, or both.

Figure 13:
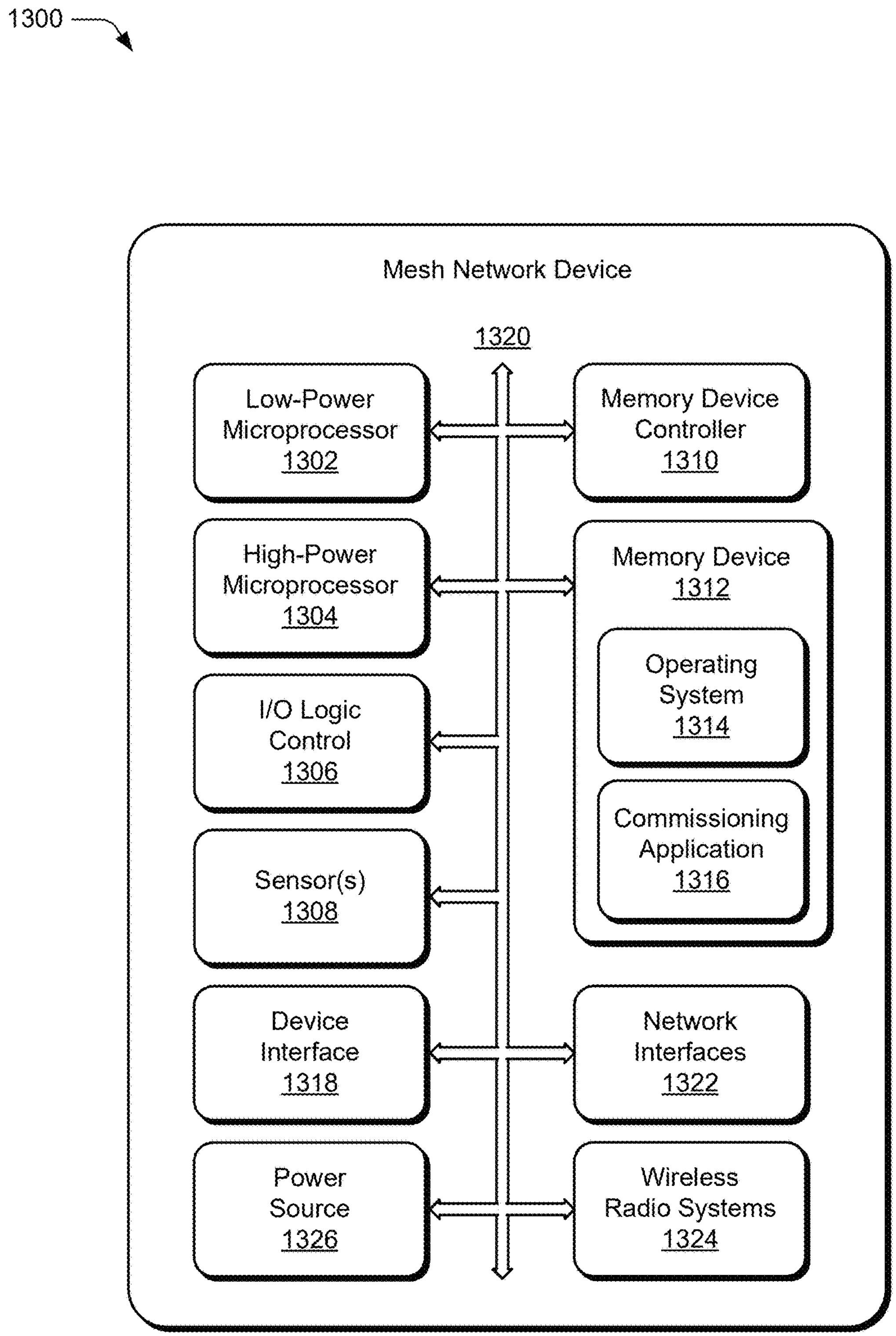
FIG. 13 illustrates an example wireless network device that can be implemented in a home area network in accordance with one or more aspects of the techniques described herein.

FIG. 13 illustrates an example wireless network device 1300 that can be implemented as any of the wireless network devices (nodes) in a home area network (Thread network, fabric network, Weave network, Matter network) in accordance with one or more aspects of a Thread credentials distribution service as described herein. The device 1300 can be integrated with electronic circuitry, microprocessors, memory, input output (I/O) logic control, communication interfaces and components, as well as other hardware, firmware, and/or software to implement the device in a home area network. Further, the wireless network device 1300 can be implemented with various components, such as with any number and combination of different components as further described with reference to the example device shown in FIG. 14.

In this example, the wireless network device 1300 includes a low-power microprocessor 1302 and a high-power microprocessor 1304 (e.g., microcontrollers or digital signal processors) that process executable instructions. The device also includes an input-output (I/O) logic control 1306 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 1302 and the high-power microprocessor 1304 can also support one or more different device functionalities of the device. For example, the high-power microprocessor 1304 may execute computationally intensive operations, whereas the low-power microprocessor 1302 may manage less-complex processes such as detecting a hazard or temperature from one or more sensors 1308. The low-power processor 1302 may also wake or initialize the high-power processor 1304 for computationally intensive processes.

The one or more sensors 1308 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio frequency (RF), other electromagnetic signals or fields, or the like. As such, the sensors 1308 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and radio frequency identification detectors. In implementations, the wireless network device 1300 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or automation objectives.

The wireless network device 1300 includes a memory device controller 1310 and a memory device 1312, such as any type of a nonvolatile memory and/or other suitable electronic data storage device. The wireless network device 1300 can also include various firmware and/or software, such as an operating system 1314 that is maintained as computer executable instructions by the memory and executed by a microprocessor. The device software may also include a commissioning application 1316 that implements aspects of Thread credentials distribution service. The wireless network device 1300 also includes a device interface 1318 to interface with another device or peripheral component and includes an integrated data bus 1320 that couples the various components of the wireless network device for data communication between the components. The data bus in the wireless network device may also be implemented as any one or a combination of different bus structures and/or bus architectures.

The device interface 1318 may receive input from a user and/or provide information to the user (e.g., as a user interface), and a received input can be used to determine a setting. The device interface 1318 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 1318 may also receive inputs from any number of peripherals, such as buttons, a keypad, a switch, a microphone, and an imager (e.g., a camera device).

The wireless network device 1300 can include network interfaces 1322, such as a home area network interface for communication with other wireless network devices in a home area network, wired network devices (e.g., Ethernet-connected devices), and an external network interface for network communication, such as via the Internet. The wireless network device 1300 also includes wireless radio systems 1324 for wireless communication with other wireless network devices via the home area network interface and for multiple, different wireless communications systems. The wireless radio systems 1324 may include Wi-Fi, Bluetooth™, Mobile Broadband, BLE, and/or point-to-point IEEE 802.15.4. Each of the different radio systems can include a radio device, antenna, and chipset that is implemented for a particular wireless communications technology. The wireless network device 1300 also includes a power source 1326, such as a battery and/or to connect the device to line voltage. An AC power source may also be used to charge the battery of the device.

Figure 14:
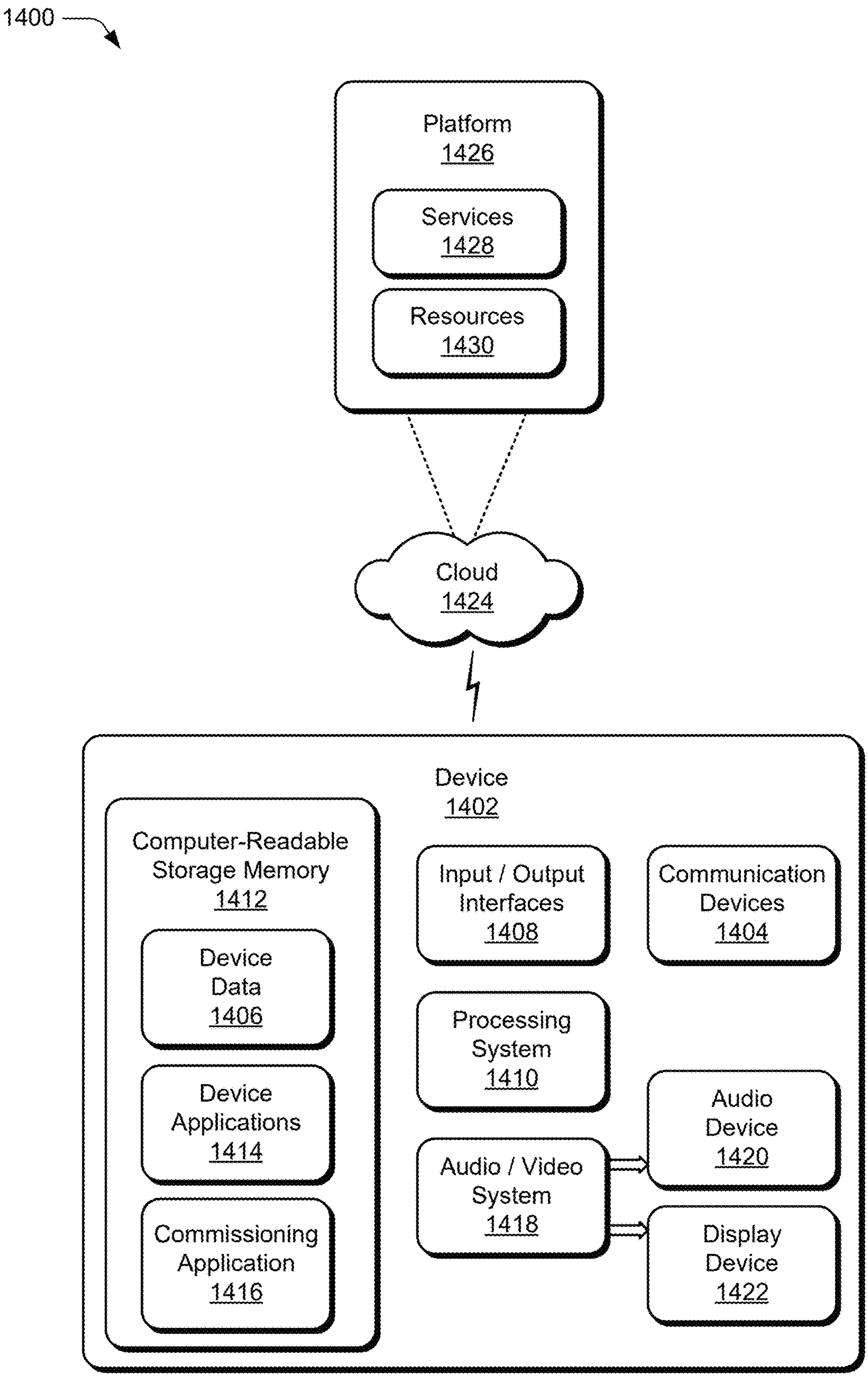
FIG. 14 illustrates an example system with an example device that can implement aspects of a Thread credentials distribution service.

FIG. 14 illustrates an example system 1400 that includes an example device 1402, which can be implemented as any of the wireless network devices that implement aspects of a Thread credentials distribution service as described with reference to the previous FIGS. 1-13. The example device 1402 may be any type of computing device, client device, mobile phone, tablet, communication, entertainment, gaming, media playback, and/or other type of device. Further, the example device 1402 may be implemented as any other type of wireless network device that is configured for communication on a home area network, such as a thermostat, hazard detector, camera, light unit, commissioning device, router, border router, joiner router, joining device, end device, leader, access point, and/or other wireless network devices.

The device 1402 includes communication devices 1404 that enable wired and/or wireless communication of device data 1406, such as data that is communicated between the devices in a home area network, data that is being received, data scheduled for broadcast, data packets of the data, data that is synchronized between the devices, etc. The device data can include any type of communication data, as well as audio, video, and/or image data that is generated by applications executing on the device. The communication devices 1404 can also include transceivers for cellular phone communication and/or for network data communication.

The device 1402 also includes input/output (I/O) interfaces 1408, such as data network interfaces that provide connection and/or communication links between the device, data networks (e.g., a home area network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, as well as audio, video, and/or image data received from any content and/or data source.

The device 1402 includes a processing system 1410 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1402 may further include any type of a system bus or other data and command transfer system that couples the various components within the device. A system bus can include any one or combination of different bus structures and architectures, as well as control and data lines.

The device 1402 also includes computer-readable storage memory 1412, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 1412 provides storage of the device data 1406 and various device applications 1414, such as an operating system that is maintained as a software application with the computer-readable storage memory and executed by the processing system 1410. The device applications may also include a device manager, such as any form of a control application, software application, signal processing and control module, code that is native to a particular device, a hardware abstraction layer for a particular device, and so on. In this example, the device applications also include a commissioning application 1416 that implements aspects of Thread credentials distribution service, such as when the example device 1402 is implemented as any of the wireless network devices described herein.

The device 1402 also includes an audio and/or video system 1418 that generates audio data for an audio device 1420 and/or generates display data for a display device 1422. The audio device and/or the display device include any devices that process, display, and/or otherwise render audio, video, display, and/or image data, such as the image content of a digital photo. In implementations, the audio device and/or the display device are integrated components of the example device 1402. Alternatively, the audio device and/or the display device are external, peripheral components to the example device. In aspects, at least part of the techniques described for Thread credentials distribution service may be implemented in a distributed system, such as over a "cloud" 1424 in a platform 1426. The cloud 1424 includes and/or is representative of the platform 1426 for services 1428 and/or resources 1430, such as for the TCDS 126, the home graph 128, the TCDS database 308, and/or the keystore 310.

The platform for the services 1426 and/or resources 1428 includes processor(s) and computer-readable storage media. The processor may be a single core processor or a multiple core processor composed of a variety of materials, such as silicon, polysilicon, high-K dielectric, copper, and so on. CRM may include any suitable memory or storage device such as random-access memory (RAM), static RAM (SRAM), dynamic RAM (DRAM), non-volatile RAM (NVRAM), read-only memory (ROM), or Flash memory useful to store device data, such as Thread network credentials and/or structure-related data.

The platform 1426 abstracts underlying functionality of hardware, such as server devices (e.g., included in the services 1428) and/or software resources (e.g., included as the resources 1430), and connects the example device 1402 with other devices, servers, etc. The resources 1430 may also include applications and/or data that can be utilized while computer processing is executed on servers that are remote from the example device 1402. Additionally, the services 1428 and/or the resources 1430 may facilitate subscriber network services, such as over the Internet, a cellular network, or Wi-Fi network. The platform 1426 may also serve to abstract and scale resources to service a demand for the resources 1430 that are implemented via the platform, such as in an interconnected device aspect with functionality distributed throughout the system 1200. For example, the functionality may be implemented in part at the example device 1402 as well as via the platform 1426 that abstracts the functionality of the cloud 1424.

Although aspects of a Thread credentials distribution service have been described in language specific to features and/or methods, the subject of the appended claims is not necessarily limited to the specific features or methods described. Rather, the specific features and methods are disclosed as example implementations of a Thread credentials distribution service, and other equivalent features and methods are intended to be within the scope of the appended claims. Further, various different aspects are described, and it is to be appreciated that each described aspect can be implemented independently or in connection with one or more other described aspects.

What is claimed is:

1. A method of managing Thread network credentials by a Thread credential distribution service (TCDS), the method comprising:

establishing a secure session with a client device;

receiving, from the client device, a first message that requests Thread network credentials;

based on the received first message, validating an identity of the client device;

using a Thread credential identifier, querying a TCDS database to retrieve Thread network credentials associated with the Thread credential identifier;

receiving, from the TCDS database, the Thread network credentials associated with the Thread credential identifier;

encrypting the received Thread network credentials;

signing the encrypted Thread network credentials; and sending the signed, encrypted Thread network credentials to the client device.

2. The method of claim 1, wherein the first message includes the Thread credential identifier.

3. The method of claim 1, wherein the first message omits the Thread credential identifier, the method further comprising:

querying a home graph to obtain a structure associated with a validated identity of the client device;

receiving the structure associated with the validated identity of the client device, the structure including a Thread credential identifier for a default Thread network of the structure; and using the Thread credential identifier for the default Thread network, querying the TCDS database to retrieve the Thread network credentials associated with the Thread credential identifier.

4. The method of claim 1, wherein the establishing the secure session comprises:

generating a shared secret for the session;

storing the shared secret in the TCDS database; and wherein the encrypting the received Thread network credentials comprises:

encrypting the received Thread network credentials using the shared secret.

5. The method of claim 1, further comprising:

receiving a second message that requests to update Thread credentials that are stored in the TCDS database, the second message including encrypted, updated Thread network credentials;

decrypting the updated Thread network credentials;

validating the decrypted, updated Thread network credentials; and storing the validated, updated Thread network credentials in the TCDS database.

6. The method of claim 5, wherein the client device is a Thread network device, the method further comprising:

querying a home graph to obtain a default credentials identifier for the Thread network device;

receiving the default credentials identifier for the Thread network device;

using the received credentials identifier, querying the TCDS database to obtain existing Thread network credentials associated with the default credentials identifier for the Thread network device;

receiving the existing Thread network credentials associated with the default credentials identifier for the Thread network device; and wherein the validating the updated Thread network credentials comprises:

validating the updated Thread network credentials against the existing Thread network credentials to determine that updated Thread network credentials are a more recent version of the Thread network credentials than the existing Thread network credentials.

7. A method of claim 1, comprising:

receiving a third message that requests to delete Thread credentials that are stored in the TCDS database, the third message including a user identity and a Thread network credential identifier of the Thread network credentials to delete;

based on the received third message, validating the user identity;

querying the TCDS database for Thread credential identifiers owned by the validated user;

receiving the Thread credential identifiers owned by the validated user; and based on the Thread network credential identifier received in the third message, sending a message to the TCDS database that directs the TCDS database to delete the Thread network credentials associated with the Thread network credential identifier from the TCDS database.

8. The method of claim 7, comprising:

directing the TCDS database to remove the validated user as an owner of the Thread network credentials associated with the Thread network credential identifier from the TCDS database; and if removing the validated user as an owner of the Thread network credentials results in no owners for the Thread network credentials in the TCDS database, directing the TCDS database to remove the Thread credentials from the TCDS database.

9. The method of claim 1, wherein the establishing a secure session with the client device, comprises:

establishing the secure session with the client device using an Elliptic-curve Diffie-Hellman (ECDH) key agreement protocol.

10. The method of claim 1, wherein the client device is one of:

a Thread network device; or a mobile device of a user.

11. An apparatus comprising:

a processor; and a memory comprising instructions to implement a Thread credential distribution service (TCDS), the instructions executable by the processor to configure the TCDS to:

establish a secure session with a client device;

receive, from the client device, a first message that requests Thread network credentials;

based on the received first message, validate an identity of the client device;

using a Thread credential identifier, query a TCDS database to retrieve Thread network credentials associated with the Thread credential identifier;

receive, from the TCDS database, the Thread network credentials associated with the Thread credential identifier;

encrypt the received Thread network credentials;

sign the encrypted Thread network credentials; and send the signed, encrypted Thread network credentials to the client device.

12. The apparatus of claim 11, wherein the first message includes the Thread credential identifier.

13. The apparatus of claim 11, wherein the first message omits the Thread credential identifier, the instructions further executable to configure the TCDS to:

query a home graph to obtain one or more structure identities associated with a validated identity of a user;

receive a structure associated with the validated identity of the user, the structure including a Thread credential identifier for a default Thread network of the structure; and using the Thread credential identifier for the default Thread network, query the TCDS database to retrieve the Thread network credentials associated with the Thread credential identifier.

14. The apparatus of claim 11, wherein the instructions to establish the secure session are further executable to configure the TCDS to:

generate a shared secret for the session;

store the shared secret in the TCDS database; and wherein the instruction to encrypt the received Thread network credentials are executable to configure the TCDS to:

encrypt the received Thread network credentials using the shared secret.

15. The apparatus of claim 11, the instructions further executable to configure the TCDS to:

receive a second message that requests to update Thread credentials that are stored in the TCDS database, the second message including encrypted, updated Thread network credentials;

decrypt the updated Thread network credentials;

validate the decrypted, updated Thread network credentials; and store the validated, updated Thread network credentials in the TCDS database.

16. The apparatus of claim 15, wherein the client device is a Thread network device, the instructions further executable to configure the TCDS to:

query a home graph to obtain a default credentials identifier for the Thread network device;

receive the default credentials identifier for the Thread network device;

using the received credentials identifier, query the TCDS database to obtain existing Thread network credentials associated with the default credentials identifier for the Thread network device;

receive the existing Thread network credentials associated with the default credentials identifier for the Thread network device; and wherein the instruction to validate the updated Thread network credentials are executable to configure the TCDS to:

validate the updated Thread network credentials against the existing Thread network credentials to determine that updated Thread network credentials are a more recent version of the Thread network credentials than the existing Thread network credentials.

17. The apparatus of claim 11, the instructions further executable to configure the TCDS to:

receive a third message that requests to delete Thread credentials that are stored in the TCDS database, the third message including a user identity and a Thread network credential identifier of the Thread network credentials to delete;

based on the received third message, validate the user identity;

query the TCDS database for Thread credential identifiers owned by the validated user;

receive the Thread credential identifiers owned by the validated user; and based on the Thread network credential identifier received in the third message, send a message to the TCDS database that directs the TCDS database to delete the Thread network credentials associated with the Thread network credential identifier from the TCDS database.

18. The apparatus of claim 17, the instructions further executable to configure the TCDS to:

direct the TCDS database to remove the validated user as an owner of the Thread network credentials associated with the Thread network credential identifier from the TCDS database; and if removal of the validated user as an owner of the Thread network credentials results in no owners for the Thread network credentials in the TCDS database, direct the TCDS database to remove the Thread credentials from the TCDS database.

19. The apparatus of claim 11, wherein the client device is one of:

a Thread network device; or a mobile device of a user.

20. A nontransitory computer-readable storage memory comprising instructions to implement a Thread credential distribution service (TCDS), the instructions executable to:

establish a secure session with a client device;

receive, from the client device, a first message that requests Thread network credentials;

based on the received first message, validate an identity of the client device;

using a Thread credential identifier, query a TCDS database to retrieve Thread network credentials associated with the Thread credential identifier;

receive, from the TCDS database, the Thread network credentials associated with the Thread credential identifier;

encrypt the received Thread network credentials;

sign the encrypted Thread network credentials; and send the signed, encrypted Thread network credentials to the client device.

* * * * *